(12) United States Patent
Qi et al.

(10) Patent No.: US 12,537,813 B2
(45) Date of Patent: Jan. 27, 2026

(54) SERVICE AUTHORIZATION METHOD AND COMMUNICATIONS APPARATUS

(71) Applicant: HUAWEI TECHNOLOGIES CO., LTD., Shenzhen (CN)

(72) Inventors: Caixia Qi, Shanghai (CN); Yu Yin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 238 days.

(21) Appl. No.: 17/237,297

(22) Filed: Apr. 22, 2021

(65) Prior Publication Data

US 2021/0250344 A1 Aug. 12, 2021

Related U.S. Application Data

(63) Continuation of application No. PCT/CN2019/110638, filed on Oct. 11, 2019.

(30) Foreign Application Priority Data

Oct. 29, 2018 (CN) .......................... 201811268836.4

(51) Int. Cl.
*H04L 9/40* (2022.01)
(52) U.S. Cl.
CPC .................................. *H04L 63/083* (2013.01)
(58) Field of Classification Search
CPC ... H04L 63/083; H04L 9/088; H04L 63/0807; H04L 63/0884; H04L 63/10;
(Continued)

(56) References Cited

U.S. PATENT DOCUMENTS

2014/0090027 A1\* 3/2014 Tamura ................... G06F 21/41
726/4
2014/0245359 A1\* 8/2014 De Foy .............. H04N 21/6181
725/62
(Continued)

FOREIGN PATENT DOCUMENTS

CN 102946397 A 2/2013
CN 104022875 A 9/2014
(Continued)

OTHER PUBLICATIONS

3GPP "3rd Generation Partnership Project; Technical Specification Group Services and System Aspects; System Architecture for the 5G System; Stage 2 (Release 15)." 3GPP TS 23.501 V15.3.0. (Sep. 2018). 226 pages.
(Continued)

*Primary Examiner* — Catherine Thiaw
*Assistant Examiner* — Nega Woldemariam
(74) *Attorney, Agent, or Firm* — Maier & Maier, PLLC

(57) ABSTRACT

A service authorization method and a communications apparatus to resolve a problem that, in a scenario in which a second server is discovered by a client, a first server fails to obtain service authorization to access the second server, so as to reduce a security risk of a service-based network. The method includes: applying, by the client on behalf of the first server, for an access token for the first server to access the second server, and notifying the access token to the first server. Alternatively, the first server applies for the access token based on an instance identifier or a resource identifier of the second server that is provided by the client.

18 Claims, 20 Drawing Sheets

(58) Field of Classification Search
CPC ....... H04L 9/3213; H04L 63/08; H04L 67/55;
H04W 12/06; H04W 12/084
USPC .......................................................... 726/9
See application file for complete search history.

(56) References Cited

U.S. PATENT DOCUMENTS

| | | | |
|---|---|---|---|
| 2015/0026772 A1* | 1/2015 | Verma ................. | H04L 63/0884 726/4 |
| 2017/0005998 A1 | 1/2017 | Gupta | |
| 2017/0171293 A1* | 6/2017 | Thomassen ............. | H04L 63/08 |
| 2018/0077135 A1 | 3/2018 | Wardman et al. | |
| 2018/0145967 A1* | 5/2018 | Matsugashita ........ | G06F 21/335 |
| 2018/0220299 A1* | 8/2018 | Gupta ................. | H04W 12/062 |
| 2018/0278603 A1* | 9/2018 | Yabe ....................... | H04L 63/08 |
| 2018/0337784 A1* | 11/2018 | Jain ........................ | G06F 21/335 |
| 2019/0028485 A1* | 1/2019 | Baird .................... | H04L 67/146 |
| 2020/0023812 A1* | 1/2020 | Hassani ................ | H04L 67/306 |
| 2020/0305055 A1* | 9/2020 | Basu Mallick ....... | H04W 36/08 |
| 2021/0234706 A1* | 7/2021 | Nair ...................... | H04L 9/0825 |
| 2021/0235266 A1* | 7/2021 | Starsinic ............... | H04W 8/183 |
| 2021/0250344 A1* | 8/2021 | Qi ......................... | H04W 12/06 |
| 2021/0258788 A1* | 8/2021 | Bykampadi ........... | G06F 21/335 |

FOREIGN PATENT DOCUMENTS

| | | |
|---|---|---|
| CN | 105991514 A | 10/2016 |
| CN | 107211007 A | 9/2017 |
| CN | 107317787 A | 11/2017 |
| CN | 107659406 A | 2/2018 |
| CN | 108665946 A | 10/2018 |
| EP | 0658848 A2 | 6/1995 |
| WO | 2016164000 A1 | 10/2016 |

OTHER PUBLICATIONS

3GPP. "3rd Generation Partnership Project; Technical Specification Group Core Network and Terminals; 5G System; Technical Realization of Service Based Architecture; Stage 3 (Release 15)." 3GPP TS 29.500 V15.1.0 (Sep. 2018). 29 pages.

3GPP. "3rd Generation Partnership Project; Technical Specification Group Core Network and Terminals; 5G System; Session Management Services; Stage 3 (Release 15)." 3GPP TS 29.502 V15.1.0 (Sep. 2018). 130 pages.

3GPP. "3rd Generation Partnership Project; Technical Specification Group Core Network and Terminals; 5G System; Network Function Repository Services; Stage 3 (Release 15)." 3GPP TS 29.510 V15.1.0 (Sep. 2018). 84 pages.

3GPP. "3rd Generation Partnership Project; Technical Specification Group Services and System Aspects; Security architecture and procedures for 5G system (Release 15)." 3GPP TS 33.501 V15.2.0 (Sep. 2018). 175 pages.

Berners-Lee et al. "Uniform Resource Identifier (URI): Generic Syntax." Network Working Group, Request for Comments: 3986. Jan. 2005. 61 pages.

Hardt, Ed. "The OAuth 2.0 Authorization Framework." Internet Engineering Task Force (IETF), Request for Comments: 6749. Oct. 2012. 76 pages.

Jones et al. "JSON Web Signature (JWS)." Internet Engineering Task Force (IETF), Request for Comments: 7515. May 2015. 59 pages.

Jones et al. "JSON Web Token (JWT)." Internet Engineering Task Force (IETF), Request for Comments: 7519. May 2015. 30 pages.

* cited by examiner

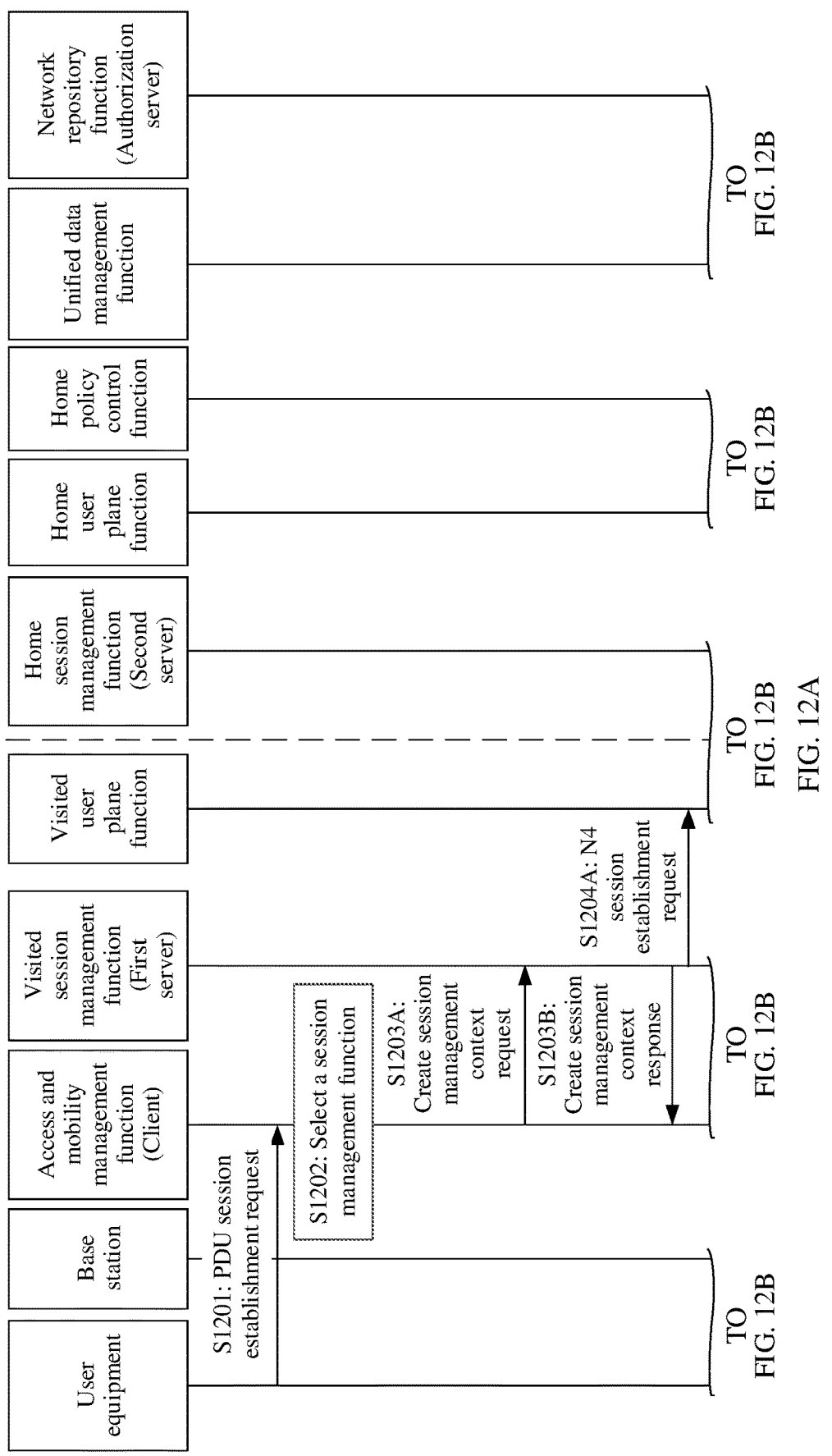

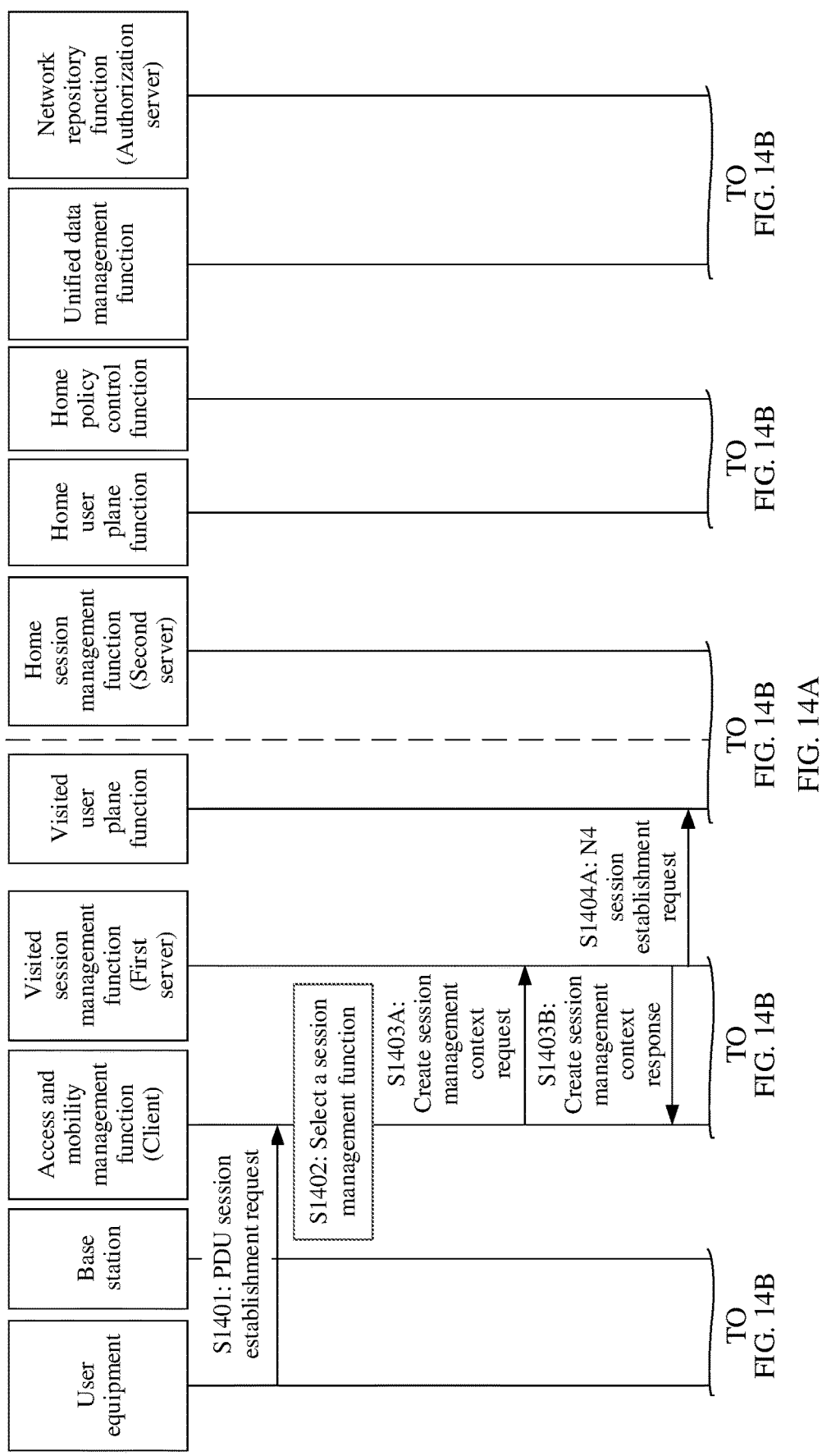

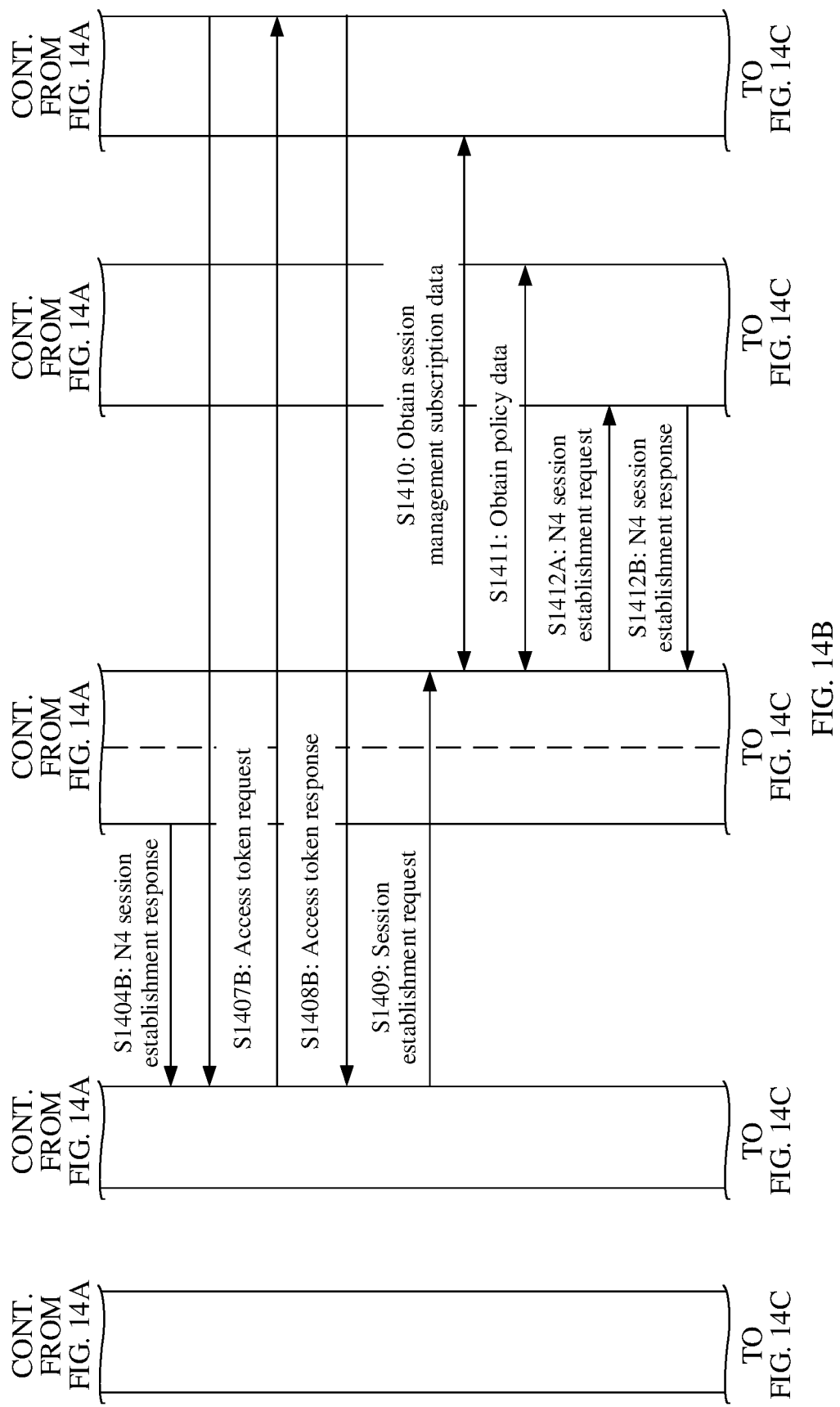

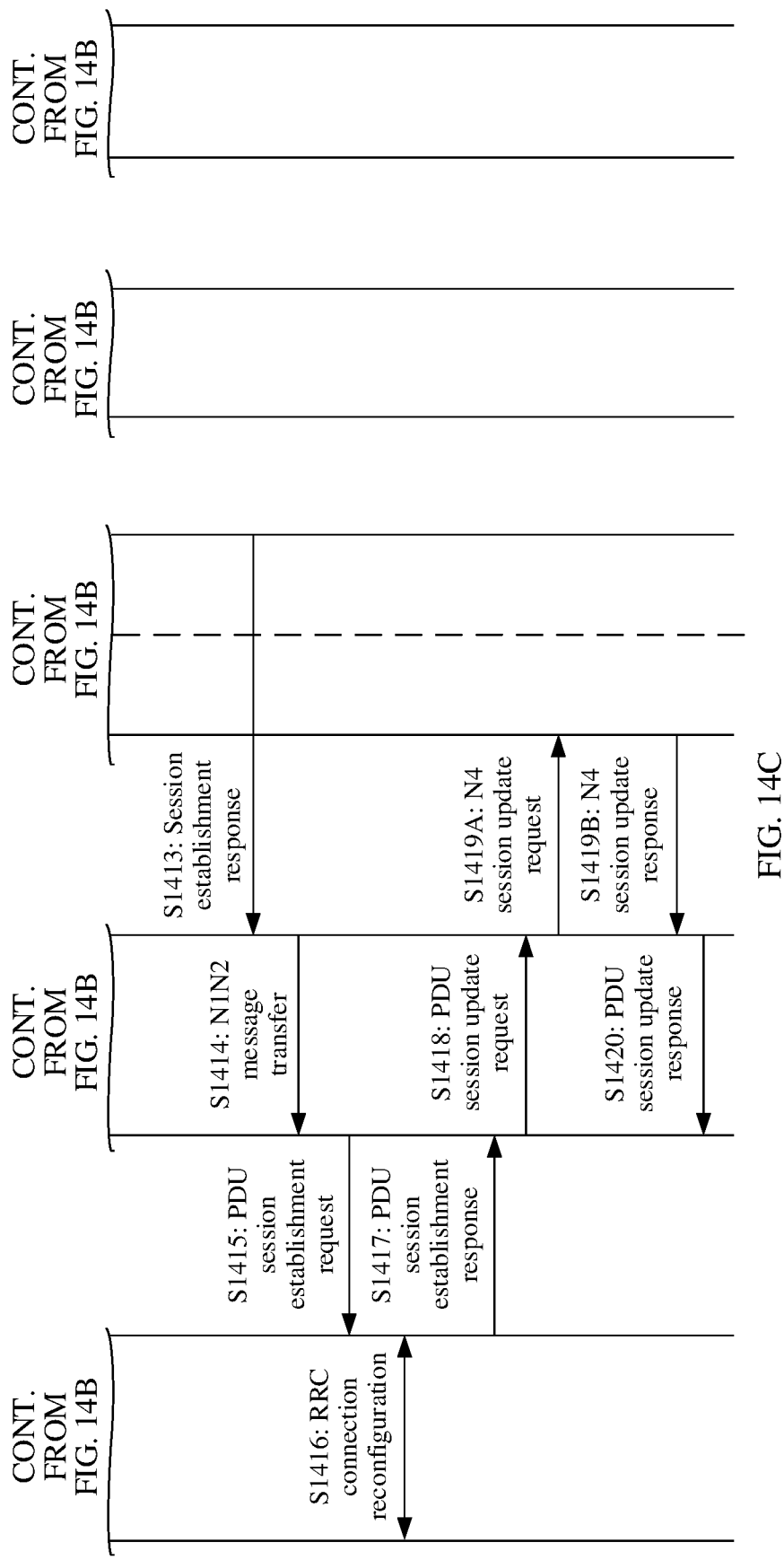

SERVICE AUTHORIZATION METHOD AND COMMUNICATIONS APPARATUS

CROSS-REFERENCE TO RELATED APPLICATIONS

This application is a continuation of International Application No. PCT/CN2019/110638, filed on Oct. 11, 2019, which claims priority to Chinese Patent Application No. 201811268836.4, filed on Oct. 29, 2018. The disclosures of the aforementioned applications are hereby incorporated by reference in their entireties.

TECHNICAL FIELD

The embodiments relate to the communications field, and in particular, to a service authorization method and a communications apparatus.

BACKGROUND

In a network deployed by using a service-based architecture (SBA), for example, in a core network (CN) of a 5th generation (5G) mobile communications system, different network functions usually communicate based on a client/server communication mode. A client is a requester, and a server is a responder. To avoid security risks to the mobile communications system caused by a case that any client can access the server, and to support restricted access of third-party clients to resources, the service-based architecture further supports a service authorization function. Specifically, the server may include an authorization server and a function server. The client applies to the authorization server for authorization information, for example, an access token, that is for the client to access the function server. Then, the client accesses the function server based on the authorization information obtained through application, and the function server authorizes access of the client based on the authorization information.

However, in the foregoing scenario, only a manner of how to authorize the client to access the function server is considered, where the function server is discovered by the client. In a scenario in which a function server A accesses a function server B, and the function server B is discovered by the client, how to authorize the function server A to access the function server B is not considered. In other words, the function server A accesses the function server B without authorization, which may cause a relatively high risk to network security.

SUMMARY

Embodiments provide a service authorization method and a communications apparatus, to resolve a problem that in a scenario in which a second server is discovered by a client, a first server fails to obtain service authorization to access the second server.

To achieve the foregoing objective, the embodiments provide the following solutions.

According to a first aspect, a service authorization method is provided, including: a client sends a first service request message to a first server. The first service request message carries service authorization information, and the service authorization information is used when the first server accesses a second server.

According to the service authorization method provided in this embodiment, the first service request message sent by the client to the first server carries the service authorization information for the first server to access the second server, so that the first server accesses the second server based on the service authorization information. This can resolve a problem that in a scenario in which the second server is discovered by the client, the first server fails to obtain service authorization to access the second server, so as to reduce a security risk of a service-based network.

For example, service authorization to access the second server by the first server may be obtained in the following two manners.

Service Authorization Manner 1:

The client may apply for the foregoing service authorization on behalf of the first server and notify the first server. For example, the client applies, on behalf of the first server, for an access token for the first server to access the second server, and sends the access token to the first server.

Service Authorization Manner 2:

The client may send related information of the second server to the first server, and then the first server applies for the foregoing service authorization. For example, the client may send an instance identifier or a resource identifier of the second server to the first server, and then the first server applies for, based on the instance identifier or the resource identifier of the second server, the access token for accessing the second server.

It should be noted that the service authorization information may be the access token, for example, a JSON Web token, or may be service access authorization information in another form. This is not limited in the embodiments.

The following separately describes solutions of service authorization manner 1 and service authorization manner 2 by using the access token as an example.

Service Authorization Manner 1:

In a possible method, the service authorization information includes the access token. It may be understood that, before the client sends the first service request message to the first server, the service authorization method may further include: the client sends an access token request message to an authorization server. The access token request message carries an instance identifier of the client and an instance identifier of the first server. Then, the client receives an access token response message sent by the authorization server. The access token response message carries the access token.

Correspondingly, that the client sends the first service request message to the first server may include: the client sends the first service request message to the first server. The first service request message includes the access token. The client is an access token requester of the second server, and the first server is a service requester of the second server. Therefore, the access token needs to include the instance identifier of the first server.

It may be understood that, if the client does not need to access the second server, that is, the client is not the service requester of the second server, the client needs to apply for the access token only for the first server rather than for the client. In this case, the access token may not include the instance identifier of the client.

Optionally, if the client needs to access the second server, that is, the client is both the access token requester of the second server and the service requester of the second server, the client needs to apply for the access token for both the client and the first server to access the second server. In this case, the access token may include the instance identifier of the client and the instance identifier of the first server.

Optionally, the access token request message may further carry a network function type of the client and a network function type of the first server, so that the authorization server determines, based on the network function type of the client and the network function type of the first server, whether to authorize the first server to access the second server.

Correspondingly, the access token may further include a server instance list and a service name list of servers that can be accessed by the client and/or the first server.

Optionally, if the server instance list includes the instance identifier of the second server, and the service name list includes service names on the second server, the service authorization information may include the access token.

Optionally, the access token may further include an instance identifier of the authorization server.

To further improve security of accessing the second server, a validity period may be further set for the access token. In view of this, the access token may further include an access token expiration time. Correspondingly, the service authorization method may further include: if the client determines, based on the access token expiration time, that the access token has expired, the client applies to the authorization server for a new access token, and notifies the new access token to the first server.

Service Authorization Manner 2:

In the embodiments, because the second server is discovered by the client, in another possible method, the client may alternatively provide the first server with information about the second server, for example, the instance identifier of the second server or the resource identifier of the second server, so that the first server autonomously applies to the authorization server for service access permission based on the information of the second server, for example, applies for the access token.

To further improve accuracy of applying for the access token, in addition to the instance identifier or the resource identifier of the second server, the service authorization information may further include a name of a service that needs to be accessed by the first server. Therefore, optionally, when the service authorization information includes the instance identifier of the second server, or the service authorization information includes the resource identifier of the second server, the service authorization information may further include the service name of the second server. The service name of the second server is a name of a service that needs to be accessed by the first server.

It should be noted that, for service authorization manner 2, the access token is applied for by the first server. For details of the solution, refer to related descriptions in the following second aspect. Details are not described herein.

According to a second aspect, a service authorization method is further provided, including: a first server receives a first service request message sent by a client. The first service request message carries service authorization information. Then, the first server obtains an access token based on the service authorization information. The access token is used when the first server accesses a second server. Then, the first server sends a second service request message to the second server. The second service request message carries the access token.

According to the service authorization method provided in this embodiment, the first server applies for, based on the service authorization information carried in the first service request message sent by the client, service authorization to access the second server by the first server, and accesses the second server based on the service authorization obtained through application. This can resolve a problem that in a scenario in which the second server is discovered by the client, the first server fails to obtain service authorization to access the second server, so as to reduce a security risk of a service-based network.

It should be noted that the service authorization method provided in the second aspect corresponds to the foregoing service authorization manner 2.

In a possible method, the service authorization information includes an instance identifier of the second server. Therefore, that the first server obtains the access token based on the service authorization information may include: the first server sends an access token request message to an authorization server. The access token request message carries the instance identifier of the second server. Then, the first server receives an access token response message sent by the authorization server. The access token response message carries the access token, and the access token is generated by the authorization server based on the instance identifier of the second server.

In another possible method, the service authorization information includes a resource identifier of the second server. Therefore, that the first server obtains the access token based on the service authorization information may include the following two phases: a network function discovery phase and an access token request phase.

The network function discovery phase may include: the first server sends a network function discovery request message to the authorization server. The network function discovery request message carries a host name of the second server, and the host name of the second server is a part of the resource identifier of the second server. Then, the first server receives a network function discovery response message sent by the authorization server. The network function discovery response message carries the instance identifier of the second server.

The access token request phase may include: the first server sends an access token request message to the authorization server. The access token request message carries the instance identifier of the second server. Then, the first server receives an access token response message sent by the authorization server. The access token response message carries the access token, and the access token is generated by the authorization server based on the instance identifier of the second server.

In still another possible method, the service authorization information includes a resource identifier of the second server. Therefore, that the first server obtains the access token based on the service authorization information includes: the first server sends an access token request message to an authorization server. The access token request message carries a host name of the second server, and the host name of the second server is a part of the resource identifier of the second server. Then, the first server receives an access token response message sent by the authorization server. The access token response message carries the access token, and the access token is generated by the authorization server based on the host name of the second server.

Optionally, the access token applied for by the first server includes the instance identifier of the second server.

For example, the access token applied for by the first server for the first server may include an instance identifier of the authorization server, an instance identifier of the first server, the instance identifier of the second server, a service name list, and an access token.

Alternatively, the access token applied for by the first server for the first server may include an instance identifier of the authorization server, an instance identifier of the first server, an instance identifier list of authorized servers, a service name list of the authorized servers, and an access token expiration time. The instance identifier list of the authorized servers includes the instance identifier of the second server, and the service name list of the authorized servers includes a service name of the second server.

It should be noted that, for service authorization manner 2, the first server only needs to apply for the access token for the first server to access the second server. Therefore, the access token applied for by the first server for the first server may not include an instance identifier of the client.

It should be noted that, in another embodiment, the first server receives the first service request message sent by the client. The first service request message carries the access token.

The first server sends the second service request message to the second server. The second service request message carries the access token.

According to a third aspect, a communications apparatus is provided, including a sending module. The sending module is configured to send a first service request message to a first server. The first service request message carries service authorization information, and the service authorization information is used when the first server accesses a second server.

In a possible embodiment, the service authorization information includes an access token, and the communications apparatus in the second aspect further includes a receiving module.

The sending module is further configured to send an access token request message to an authorization server before the sending module sends the first service request message to the first server. The access token request message carries an instance identifier of the communications apparatus and an instance identifier of the first server. The receiving module is configured to receive an access token response message sent by the authorization server. The access token response message carries the access token. The sending module is further configured to send the first service request message to the first server. The first service request message includes the access token. The access token includes the instance identifier of the first server. Alternatively, the access token includes the instance identifier of the communications apparatus and the instance identifier of the first server.

Optionally, the access token request message further carries a network function type of the communications apparatus and/or a network function type of the first server.

Optionally, the access token may further include an access token expiration time, and the communications apparatus in the third aspect may further include a processing module. The processing module is configured to: if the processing module determines, based on the access token expiration time, that the access token has expired, control the sending module and the receiving module to apply to the authorization server for a new access token, and control the sending module to notify the new access token to the first server.

Optionally, when the service authorization information includes an instance identifier of the second server, or the service authorization information includes a resource identifier of the second server, the service authorization information further includes a service name of the second server. The service name of the second server is a name of a service that needs to be accessed by the first server.

It should be noted that the communications apparatus in the third aspect may be the foregoing client, or may be a chip system disposed in the foregoing client. This is not limited in the embodiments.

According to a fourth aspect, a communications apparatus is further provided, including a receiving module, a sending module, and an obtaining module. The receiving module is configured to receive a first service request message sent by a client. The first service request message carries service authorization information. The obtaining module is configured to obtain an access token based on the service authorization information. The access token is used when the communications apparatus accesses a second server. The sending module is configured to send a second service request message to the second server. The second service request message carries the access token.

In a possible embodiment, the service authorization information includes an instance identifier of the second server. Correspondingly, the sending module is further configured to send an access token request message to an authorization server. The access token request message carries the instance identifier of the second server. The receiving module is further configured to receive an access token response message sent by the authorization server. The access token response message carries the access token, and the access token is generated by the authorization server based on the instance identifier of the second server.

In another possible embodiment, the service authorization information includes a resource identifier of the second server. Correspondingly, the sending module is further configured to send a network function discovery request message to an authorization server. The network function discovery request message carries a host name of the second server, and the host name of the second server is a part of the resource identifier of the second server. The receiving module is further configured to receive a network function discovery response message sent by the authorization server. The network function discovery response message carries an instance identifier of the second server. The sending module is further configured to send an access token request message to the authorization server. The access token request message carries the instance identifier of the second server. The receiving module is further configured to receive an access token response message sent by the authorization server. The access token response message carries the access token, and the access token is generated by the authorization server based on the instance identifier of the second server.

In still another possible embodiment, the service authorization information includes a resource identifier of the second server. Correspondingly, the sending module is further configured to send an access token request message to an authorization server. The access token request message carries a host name of the second server, and the host name of the second server is a part of the resource identifier of the second server. The receiving module is further configured to receive an access token response message sent by the authorization server. The access token response message carries the access token, and the access token is generated by the authorization server based on the host name of the second server.

Optionally, the access token applied for by the first server includes the instance identifier of the second server.

It should be noted that the communications apparatus in the fourth aspect may be the first server, or may be a chip system disposed in the first server. This is not limited in the embodiments.

According to a fifth aspect, a communications apparatus is provided, including a processor and a transceiver. The processor is coupled to a memory. The processor is configured to execute a computer program stored in the memory, so that the communications apparatus performs the service authorization method according to any one of the first aspect and the optional implementations of the first aspect, or performs the service authorization method according to any one of the second aspect and the optional implementations of the second aspect.

It should be noted that the communications apparatus in the fifth aspect may be the foregoing client or the foregoing first server, or may be a chip system disposed in the foregoing client or the foregoing first server. This is not limited in the embodiments.

According to a sixth aspect, a communications system is provided. The communications system includes the foregoing client, the foregoing first server, the foregoing authorization server, and the foregoing second server.

According to a seventh aspect, a computer-readable storage medium is provided. The computer-readable storage medium stores programs or instructions. When the programs or the instructions are run on a computer, the computer is enabled to perform the service authorization method according to any one of the first aspect or the optional implementations of the first aspect, or perform the service authorization method according to any one of the second aspect or the optional implementations of the second aspect.

According to an eighth aspect, a computer program product is provided, including computer program code. When the computer program code is run on a computer, the computer is enabled to perform the service authorization method according to any one of the first aspect or the optional implementations of the first aspect, or perform the service authorization method according to any one of the second aspect or the optional implementations of the second aspect.

BRIEF DESCRIPTION OF DRAWINGS

FIG. 12A, FIG. 12B, and FIG. 12C are a schematic flowchart 5 of a service authorization method based on service authorization manner 2 according to an embodiment;

FIG. 14A, FIG. 14B, and FIG. 14C are a schematic flowchart 7 of a service authorization method based on service authorization manner 2 according to an embodiment;

DETAILED DESCRIPTION OF THE EMBODIMENTS

The following describes solutions of the embodiments with reference to the accompanying drawings.

The solutions in embodiments may be applied to various communications systems, for example, a 5th generation (5G) mobile communications system and a future communications system such as a 6G system.

The embodiments present all aspects and/or features by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in the embodiments, the terms such as "for example" and "such as" are used to represent giving an example, an illustration, or a description. Any embodiment or design described as an "example" should not be explained as being more preferred or having more advantages than another embodiment or design. In other words, the term "example" is used to present a concept in a specific manner.

In the embodiments, the terms "information", "signal", "message", "channel", and "signaling" may sometimes be interchangeably used. It should be noted that meanings expressed by the terms are consistent when differences between the terms are not emphasized. "Of", "corresponding and relevant", and "corresponding" may sometimes be interchangeably used. It should be noted that meanings expressed by the terms are consistent when differences between the terms are not emphasized.

In the embodiments, sometimes a subscript, such as W1, may be written in an another form, such as W1. Expressed meanings are consistent when differences between them are not emphasized.

A network architecture and a service scenario that are described in the embodiments are intended to describe the solutions in the embodiments more clearly, and are non-limiting. A person of ordinary skill in the art may know that, with evolution of the network architecture and emergence of a new service scenario, the solutions provided in the embodiments are also applicable to similar problems.

In the embodiments, some scenarios are described by using a scenario in a 5G system as an example. It should be noted that the solutions in the embodiments may also be applied to another mobile communications system, and a corresponding name may also be replaced with a name of a corresponding function in the another mobile communications system.

Figure 1:
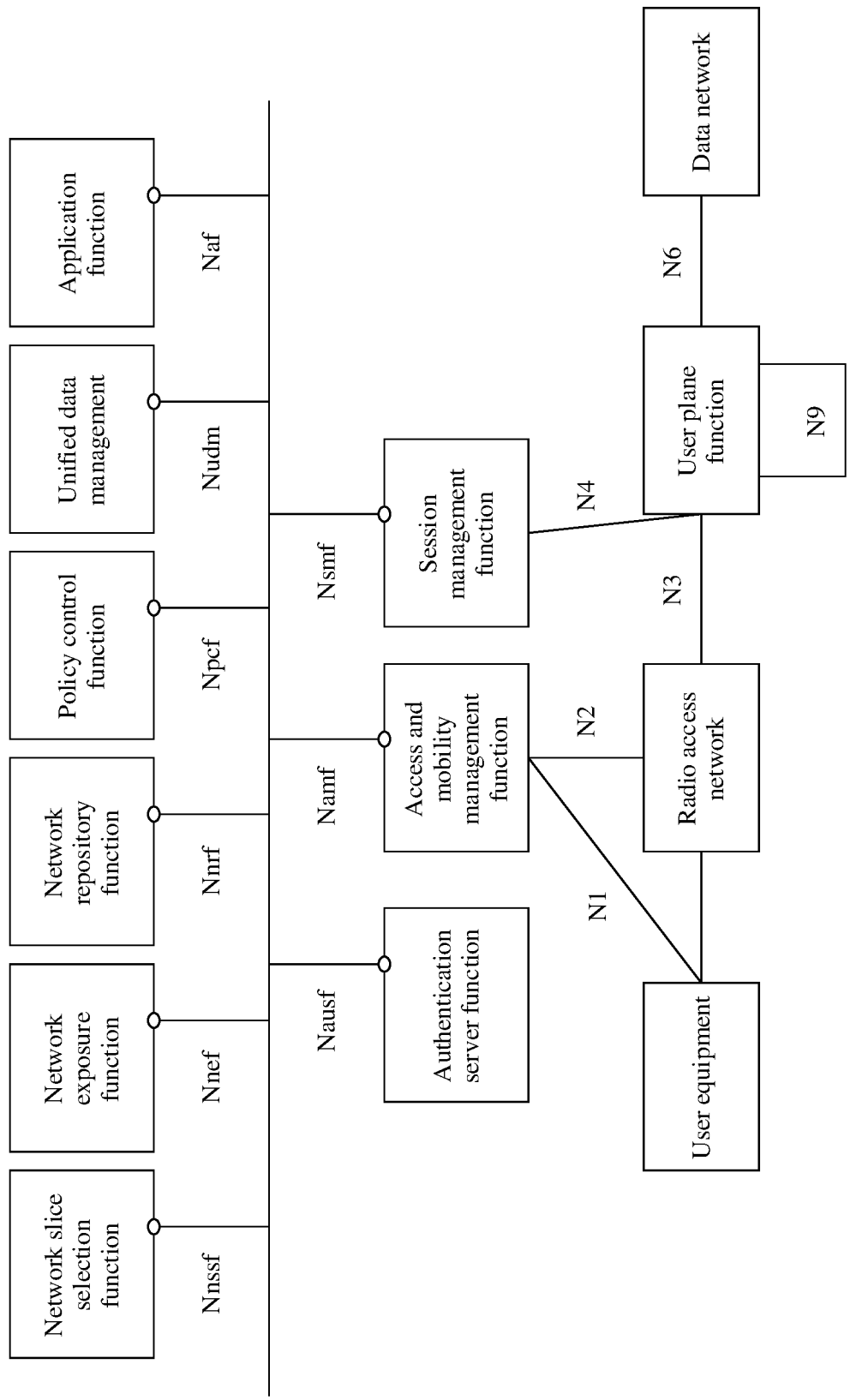
FIG. 1 is a schematic structural diagram of a communications system to which a service authorization method is applicable according to an embodiment.

For ease of understanding of the embodiments, a communications system shown in FIG. 1 is first used as an example to describe in detail a communications system to which the embodiments are applicable.

As shown in FIG. 1, the communications system includes user equipment (UE), a radio access network (RAN), and a core network (CN). The user equipment may access the radio access network through an access network device such as a base station, and establish a communication connection to an external data network (DN) through the core network. The core network is mainly used for user equipment registration, security authentication, mobility management, location management, session management, data packet forwarding between the user equipment and the external data network, and the like.

The radio access network may be a next generation access network (NG-AN). The core network includes the following network functions: a session management function (SMF), an access and mobility management function (AMF), a user plane function (UPF), unified data management (UDM), a policy control function (PCF), an authentication service function (AUSF), a network slice selection function (NSSF), a network exposure function (NEF), a network repository function (NRF), an application function (AF), and the like.

It should be noted that the core network may include one or more core network devices. The core network device may be a network element configured to perform the foregoing single network function, or may be a network element configured to perform the foregoing plurality of network functions. When one core network device is configured to perform the foregoing plurality of network functions, the core network device may include one or more functional modules configured to perform the foregoing plurality of network functions. The functional module may be a software module, or may be a software/hardware module. This is not limited in the embodiments.

For ease of description, the foregoing network function, the network element, the device, and the function module that are configured to perform the foregoing network functions, and a chip system disposed inside the network element and the device are collectively referred to as network functions in the following.

It should be noted that the core network in the foregoing communications system may use a service based architecture (SBA) architecture. In other words, the foregoing different network functions may communicate with each other based on a client-server mode. A service consumer is referred to as a client, and a service provider is referred to as a server. For example, control plane network functions such as the access and mobility management function, the session management function, the policy control function, and the unified data management function may interact with each other through a service-based interface. For example, as shown in FIG. 1, a service-based interface provided by the access and mobility management function may be Namf, a service-based interface provided by the session management function may be Nsmf, a service-based interface provided by the policy control function may be Npcf, and a service-based interface provided by the unified data management function may be Nudm.

The access network device is a device that is located on a network side of the communications system and that has a wireless transceiver function or may be a chip that can be disposed on the device. The access network device includes but is not limited to an evolved NodeB (eNB), a radio network controller (RNC), a NodeB (NB), a base station controller (BSC), a base transceiver station (BTS), a home base station (for example, a home evolved NodeB, or an HNB), a baseband unit (BBU), an access point (AP) in a wireless fidelity (WI-FI) system, a wireless relay node, a wireless backhaul node, a transmission point (transmission and reception point, TRP, or transmission point, TP), or the like. Alternatively, the access network device may be a gNB or a transmission point (TRP or TP) in a 5G system such as a new radio (NR) system, or one antenna panel or a group of antenna panels (including a plurality of antenna panels) of a base station in a 5G system, or may be a network node, such as a BBU or a distributed unit (DU), that constitutes a gNB or a transmission point.

The user equipment is a terminal device that accesses the communications system and that has a wireless transceiver function, or a chip that can be disposed on the terminal device. The user equipment may also be referred to as a user apparatus, an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments may be a mobile phone, a tablet computer ("pad" or the like), a computer having the wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

It should be understood that FIG. 1 is merely a simplified example schematic diagram for ease of understanding. The communications system may further include another network device or another terminal device that is not shown in FIG. 1.

To reduce a security risk of the foregoing communications system, the foregoing network repository function not only provides a registration function and a discovery function of the network function, but also integrates functions of an OAuth2.0 authorization server.

Figure 2:
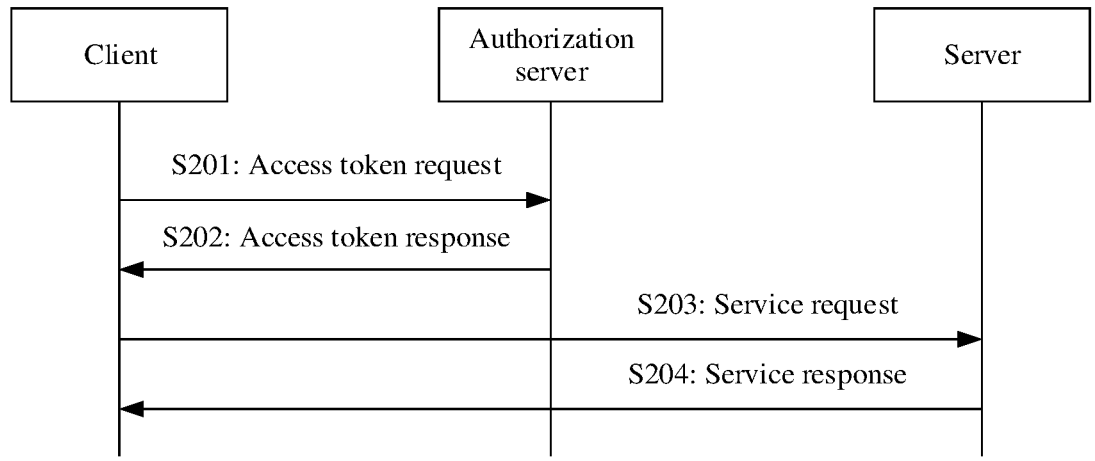
FIG. 2 is a schematic flowchart of a client/server model-based communication method.

FIG. 2 is a schematic flowchart of a communication method based on the foregoing OAuth2.0 authorization service mechanism. As shown in FIG. 2, the communication method based on the OAuth2.0 authorization service mechanism may generally include S201 to S204:

S201: A client applies to an authorization server for an access token for accessing a server.

S202: The authorization server performs authentication on the client, and allocates the access token to the client if the authentication succeeds.

S203: The client sends a service request to the server to access a resource provided by the server.

The service request carries the access token obtained in S202.

S204: The server determines validity of the access token, and if the access token is valid, allows the client to access the resource of the server by replying with a service response message.

For example, in a 5G communications system to which the OAuth2.0 authorization service mechanism is applied, there may be communication methods in the following two communication modes in the communications system shown in FIG. 1, which are separately described in the following.

Figure 3:
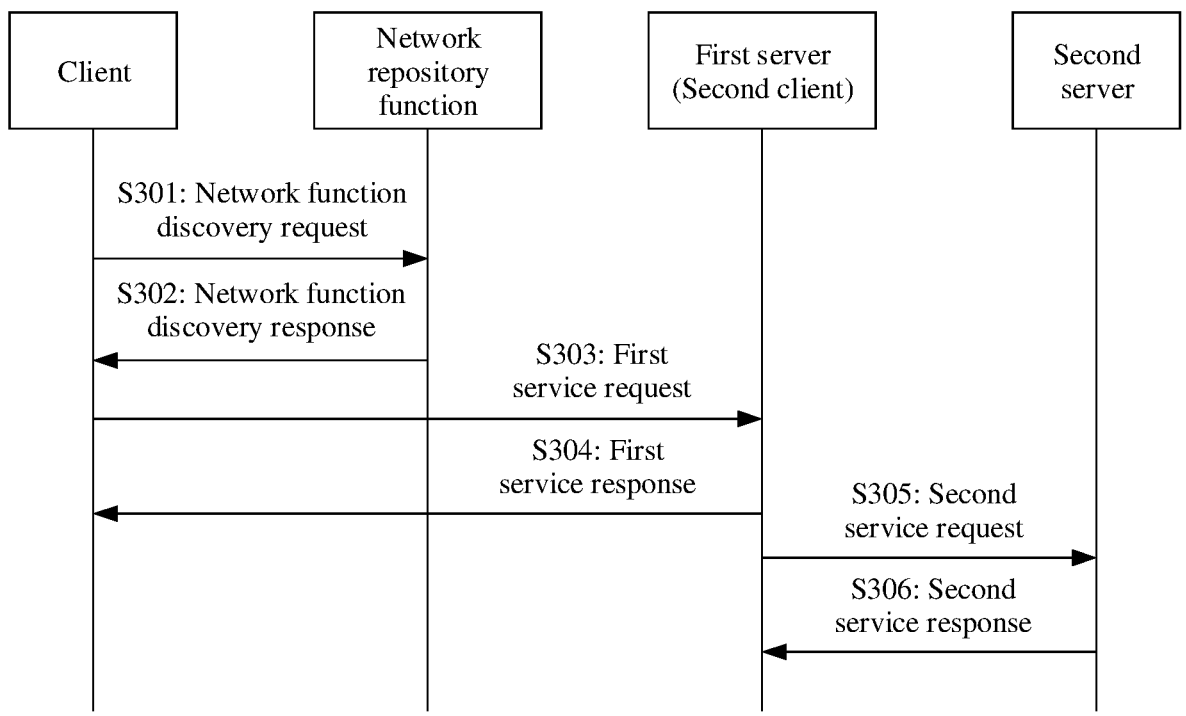
FIG. 3 is a schematic flowchart of a client/server model-based communication method in communication mode 1.

Communication Mode 1:

FIG. 3 is a schematic flowchart of a communication method in communication mode 1 based on the OAuth2.0 authorization service mechanism. As shown in FIG. 3, the communication method includes S301 to S306:

S301: A first client sends a network function discovery request message to a network repository function, where the network function discovery request message carries information such as a target network function type, a service name list, and a network function type of the first client.

S302: The network repository function returns a list of servers meeting a request condition to the first client based on the network function discovery request message. The list of servers includes information about one or more servers, and the information about the server includes an instance identifier, a network function type, and the like of the server. The first client may select a target server for access, for example, a second server, from the list of servers. For example, the target server may be selected based on a load balancing principle or a priority principle.

S303: The first client accesses a resource provided by the first server, and sends a first service request message to a first server. The first service request message carries a resource identifier of the second server. The resource identifier of the second server may be a uniform resource identifier (URI) of the second server, and the resource identifier of the second server may be generated by the first client based on the information about the second server obtained in step 2.

S304: The first server replies with a first service request response message. The first service request response message carries a resource requested by the first client.

S305: The first server also serves as a second client, and sends a second service request message to the second server based on the resource identifier of the second server. The second service request message is used to request to access a resource provided by the second server.

S306: The second server returns a second service response message. The second service request response message carries a resource requested by the first server.

Figure 4A:
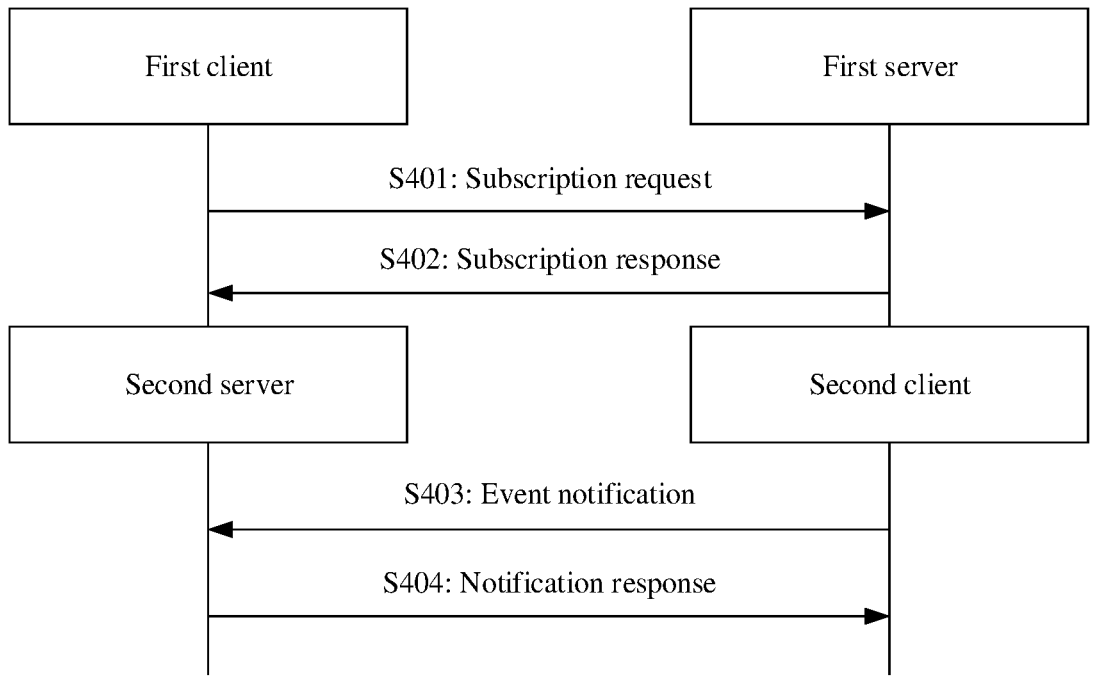
FIG. 4A is a schematic flowchart 1 of a client/server model-based communication method in communication mode 2.

Communication Mode 2:

FIG. 4A is a schematic flowchart of a communication method in communication mode 2 based on the OAuth2.0 authorization service mechanism. Communication mode 2 shown in FIG. 4A is a subscribe/notify mode in a 5G system. A client serves as a service consumer, a server serves as a service provider, and the service consumer subscribes to a network event that occurs on the service provider. When the network event is triggered, the service provider sends an event notification message to the service consumer.

As shown in FIG. 4A, the communication method includes S401 to S404:

S401: A first client sends a subscription request message to a first server. The subscription request message carries a subscribed event and a resource identifier of the second server, and the resource identifier of the second server is a uniform resource identifier of the second server.

S402: The first server replies with a subscription response.

S403: When the subscribed event is triggered, the first server also serves as a second client, and sends an event notification to the second server based on the resource identifier of the second server.

S404: The second server replies with an event notification response.

In the foregoing communication mode, the first client also serves as the second server.

Figure 4B:
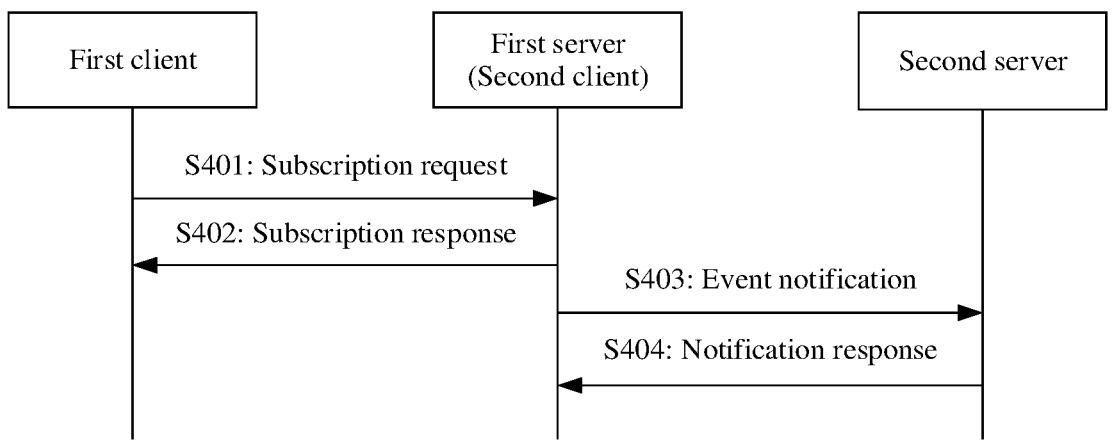
FIG. 4B is a schematic flowchart 2 of a client/server model-based communication method in communication mode 2.

FIG. 4B is a schematic flowchart of another communication method in communication mode 2 based on the OAuth2.0 authorization service mechanism. A difference between FIG. 4B and FIG. 4A lies in that the second server in FIG. 4B is another network function rather than the first client.

A similarity between the foregoing two communication modes lies in that the second client serves as the first server to access, by using the resource identifier of the second server provided by the first client, the resource provided by the second server. However, in a process of accessing the second server, the second client does not obtain service authorization for the second server. In other words, the second client accesses the second server without service authorization, which may cause a relatively high risk to network security. Therefore, in a scenario in which the second server is discovered by the first client, how to obtain service authorization to access the second server by the first server that serves as the second client becomes an urgent problem to be resolved.

For ease of description, the "first client" is referred to as a "client" below, and the "first server" and the "second client" are collectively referred to as "first servers".

In this embodiment, because a second server is discovered by a client, service authorization to access the second server by a first server may be obtained in one of the following two service authorization manners.

Service Authorization Manner 1:

Here, the client may apply, on behalf of the first server, for access permission to access the second server by the first server, and notify the first server. For example, the client may apply, on behalf of the first server, for an access token for the first server to access the second server, and sends the access token to the first server.

Service Authorization Manner 2:

Here, the client may send related information about the second server to the first server, and then the first server applies for the access permission to access the second server. For example, the client may send an instance identifier or a resource identifier of the second server to the first server, and then the first server applies for, based on the instance identifier or the resource identifier of the second server, the access token for accessing the second server.

It should be noted that the access permission to access the second server by the first server may be the access token, for example, a JSON Web token, or may be access permission in another form. This is not limited in the embodiments.

The following separately describes the solutions of service authorization manner 1 and service authorization manner 2 with reference to the accompanying drawings.

Figure 5:
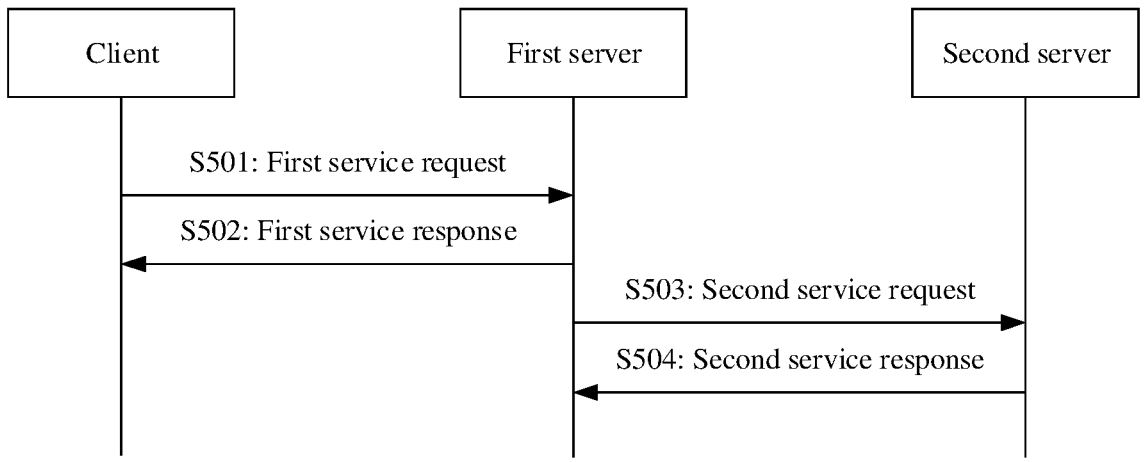
FIG. 5 is a schematic flowchart 1 of a service authorization method based on service authorization manner 1 according to an embodiment.

Service Authorization Manner 1:

FIG. 5 is a schematic flowchart of a service authorization method based on service authorization manner 1 according to an embodiment. The method is applicable to communication between different network functions in the communications system shown in FIG. 1. As shown in FIG. 5, the service authorization method includes S501 to S504.

S501: A client sends a first service request message to a first server.

S502: The client receives a first service response message sent by the first server.

The first service request message carries service authorization information. The service authorization information is used when the first server accesses a second server.

The service authorization information may include an access token. The access token may be applied for by the client in advance on behalf of the first client. Alternatively, the access token is applied for by another network function other than the client and the first server and sent to the client, and then forwarded by the client to the first server. This is not limited in the embodiments.

Figure 6:
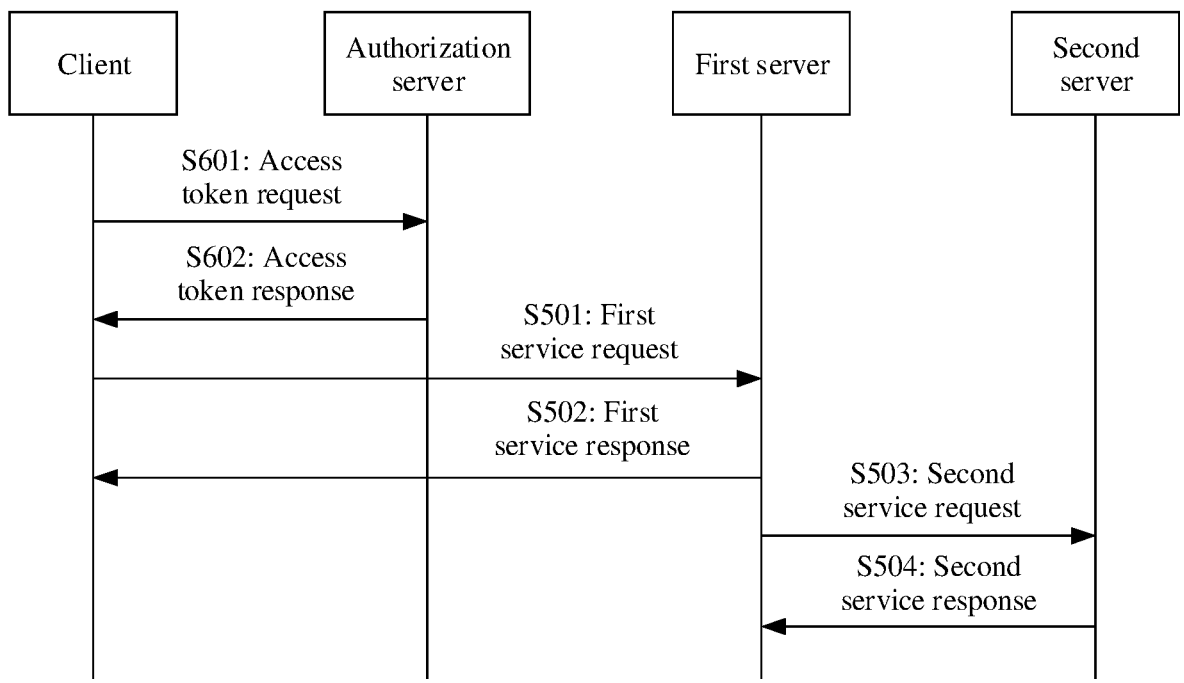
FIG. 6 is a schematic flowchart 2 of a service authorization method based on service authorization manner 1 according to an embodiment.

In a possible method, assuming that the access token is applied for by the client on behalf of the first server, as shown in FIG. 6, before S501 in which the client sends the first service request message to the first server is performed, the service authorization method based on service authorization manner 1 may further include S601 and S602:

S601: The client sends an access token request message to an authorization server.

The access token request message carries an instance identifier of the client and an instance identifier of the first server.

S602: The client receives an access token response message sent by the authorization server. The access token response message carries the access token.

In S601 and S602, the client is an applicant of the access token. Therefore, the access token request message needs to carry the instance identifier of the client, so that the authorization server sends the generated access token to the access token applicant, and the access token applicant notifies the access token to the access token user.

Correspondingly, because the access token is applied for by the first server, the access token request message further needs to include the instance identifier of the first server.

It may be understood that, if the client does not need to access the second server, that is, the client is not a service consumer of the second server, the client needs to apply for the access token only for the first server rather than the client. In this case, the client indicates, in the access token request message, the instance identifier of the client as an instance identifier of an access token requester, and indicates the instance identifier of the first server as an instance identifier of a service consumer. The authorization server allocates the access token, where the access token may not include the instance identifier of the client.

Optionally, if the client also needs to access the second server, that is, the client is both the access token requester of the second server and the service consumer of the second server, the client needs to apply for the access token for both the client and the first server to access the second server. In this case, the client indicates, in the access token request message, the instance identifier of the client and the instance identifier of the first server as instance identifiers of the service consumer. The authorization server allocates the access token, where the access token needs to include the instance identifier of the client and the instance identifier of the first server.

Implementation 1: The access token request message may further carry a network function type of the client and/or a network function type of the first server, and a network function type of the second server and an expected service name list, so that the authorization server determines, based on the network function type of the client and/or the network function type of the first server, and the network function type of the second server and the expected service name list, to authorize the client and/or the first server to access the second server of the network function type, and generates the access token. The access token further includes the network function type of the second server and the expected service name list.

Implementation 2: The access token request message may further carry an instance identifier of the second server and an expected service name list. For example, the expected service name list of the server may include names of one or more services of the second server. In this way, the authorization server determines, based on the instance identifier of the second server and the expected service name list, to authorize the client and/or the first server to access the second server corresponding to the instance identifier of the second server. Therefore, optionally, the access token may further include the instance identifier of the second server and the service name list.

Optionally, in the foregoing two implementations, the access token may further include an instance identifier of the authorization server, and the instance identifier is used to indicate identity information of an authorizer of the access token.

Optionally, in the foregoing two implementations, the access token may further include an access token expiration time, to refresh the access token when the access token expires, thereby enhancing network security.

Corresponding to S601 and S602, that the client sends the first service request message to the first server in S501 may be implemented as the following steps:

The client sends the first service request message to the first server, where the first service request message includes the access token.

To further reduce a security risk of accessing the second server, the authorization server may further set a validity period for the access token. In view of this, the access token may further include the access token expiration time. Correspondingly, the foregoing service authorization method may further include the following steps:

If the client determines, based on the access token expiration time, that the access token has expired, the client applies to the authorization server for a new access token, and notifies the new access token to the first server.

S503: The first server sends a second service request message to the second server, where the message carries the access token.

S504: The first server receives a second service response message sent by the second server.

For example, the first server sends the obtained access token to the second server, and the second server determines, after verifying validity of the access token, to allow the first server to access a resource on the second server.

The following describes the service authorization method shown in FIG. 6 by using a capability exposure procedure in a 5G system. A unified data management function is a client, an access and mobility management function is a first server, a network exposure function is a second server, and a network repository function is an authorization server.

Figure 7:
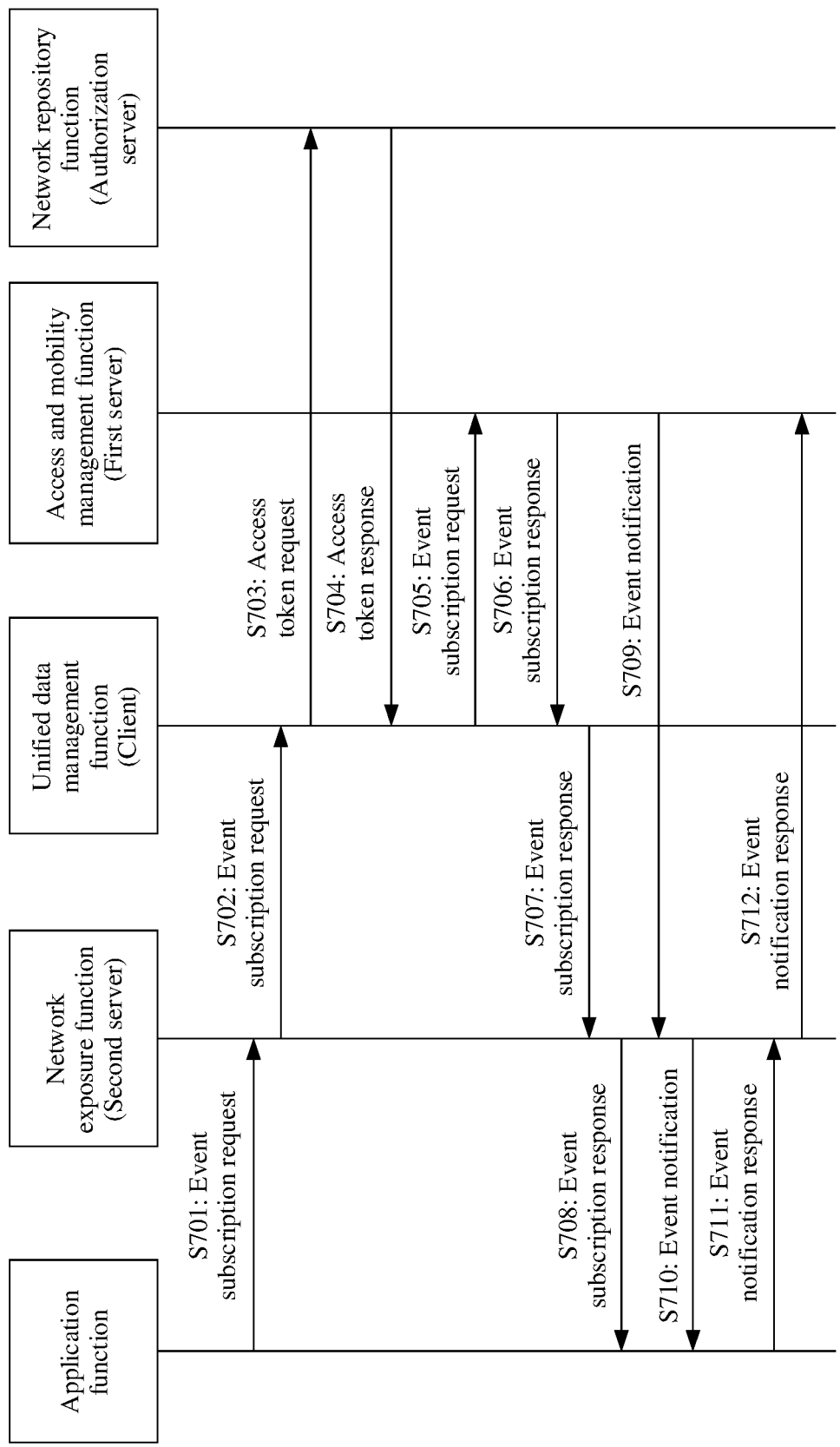
FIG. 7 is a schematic flowchart 3 of a service authorization method based on service authorization manner 1 according to an embodiment.

As shown in FIG. 7, another service authorization method based on service authorization manner 1 includes S701 to S712.

S701: An application function sends an event subscription request message to the network exposure function. The event subscription request message is used to subscribe to one or more network events, and the event subscription request message carries information such as a subscribed event and a resource identifier of an application function.

S702: The network exposure function sends the event subscription request message to the unified data management function. The event subscription request message carries a resource identifier of the network exposure function.

In addition, the event subscription request message may further carry a network function type. The network function type is the network exposure function.

S703: The unified data management function sends an access token request message to the network repository function.

The access token request message carries an instance identifier and a network function type of the unified data management function, an instance identifier and a network function type of the access and mobility management function, an expected network function type, and an expected service name list. The expected network function type is the network exposure function (obtained from S702), and the expected service name list may be a wildcard or a subscription/notification indication.

S704: The network repository function determines, based on information carried in the access token request message, to authorize access to a resource of the network exposure function, generates an access token, and sends the access token to the unified data management function.

For example, the determining to authorize access to a resource of the network exposure function and generating an access token may be performed in one of the following two token generation manners:

Token Generation Manner 1:

If the instance identifier and the network function type of the unified data management function that are carried in the access token request message are an instance identifier and a network function type of an access token requester, and the instance identifier and the network function type of the access and mobility management function are an instance identifier and a network function type of a service consumer, the network repository function determines to allow the unified data management function to request the access token, and allow the access and mobility management function to access the resource of the network exposure function.

The network repository function generates the access token. The access token includes an instance identifier of the network repository function, the instance identifier of the access and mobility management function, an authorized network function type and service name list, and an access token expiration time. The authorized network function type is the network exposure function.

Token Generation Manner 2:

If both the instance identifier and the network function type of the unified data management function, and the instance identifier and the network function type of the access and mobility management function that are in the access token request message are instance identifiers and network function types of a service consumer, the network repository function determines to allow the unified data management function and the access and mobility management function to access the resource provided by the network exposure function.

The network repository function generates the access token. The access token includes an instance identifier of the network repository function, the instance identifier of the unified data management function, the instance identifier of the access and mobility management function, an authorized network function type and service name list, and an access token expiration time. The authorized network function type is the network exposure function.

It should be noted that the access token may be a JSON Web token, for example, an access token with a JSON Web signature (JWS). The JSON Web signature may be a digital signature or message authentication code (MAC).

The resource identifier of the network exposure function may be a uniform resource identifier. The instance identifier of the unified data management function, the instance identifier of the access and mobility management function, and the instance identifier of the network repository function may be instance identifiers, of network functions, in a universally unique identifier (UUID) format.

S705: If the unified data management function determines that the service name list in the returned access token in S704 is the wildcard or the subscription/notification indication, the unified data management function sends the event subscription request message to the access and mobility management function. The event subscription request message carries the resource identifier of the network exposure function and the access token.

S706: The access and mobility management function replies to the unified data management function with an event subscription response.

S707: The unified data management function replies to the network exposure function with the event subscription response.

S708: The network exposure function replies to the application function with the event subscription response.

S709: If the access and mobility management function determines that the service name list in the access token is the wildcard or the subscription/notification indication, and the access and mobility management function detects that the subscribed event is triggered, the access and mobility management function sends an event notification to the network exposure function corresponding to the resource identifier of the network exposure function. The event notification carries the access token.

S710: The network exposure function verifies validity of the access token, for example, verifies the signature by using a public key of the authorization server or verifies a MACs value by using a shared key. If verification succeeds, it indicates that the access and mobility management function is allowed to access the resource, and the network exposure function sends the event notification to the application function.

S711: The application function replies to the network exposure function with an event notification response.

S712: The network exposure function replies to the access and mobility management function with the event notification response.

According to the service authorization method provided in this embodiment, a first service request message sent by the client to the first server carries service authorization information for the first server to access the second server, so that the first server accesses the second server based on the service authorization information. This can resolve a problem that in a scenario in which the second server is discovered by the client, the first server fails to obtain service authorization to access the second server, so as to reduce a security risk of a service-based network.

Service Authorization Manner 2:

In this embodiment, because a second server is discovered by a client, or the client may provide information about the second server for a first server, for example, an instance identifier of the second server or a resource identifier of the second server, so that the first server autonomously applies to an authorization server for access permission for the second server based on the foregoing information of the second server, for example, applies for an access token.

Figure 8:
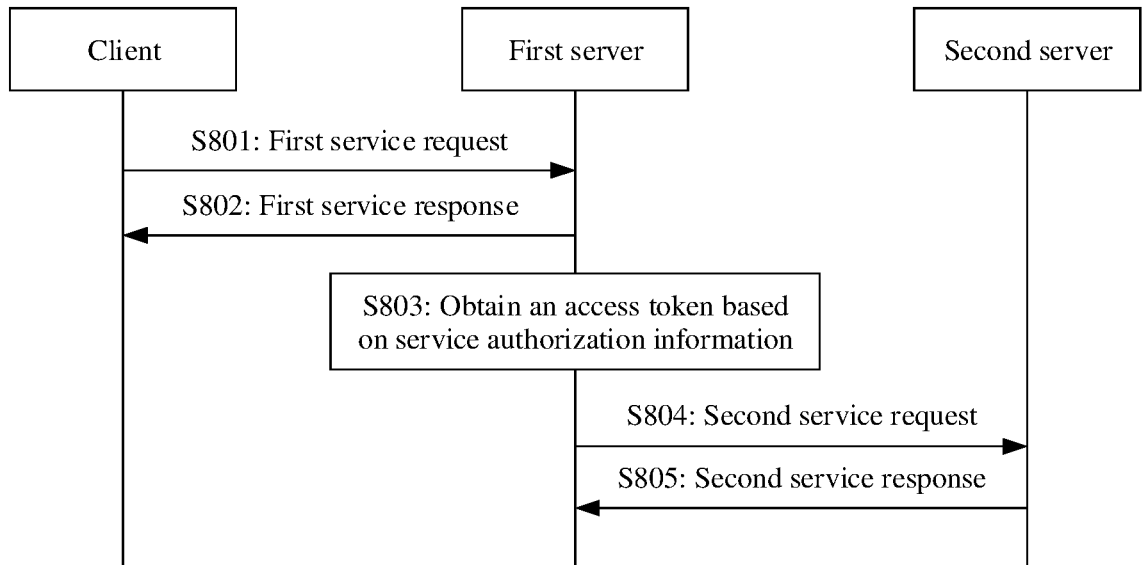
FIG. 8 is a schematic flowchart 1 of a service authorization method based on service authorization manner 2 according to an embodiment.

FIG. 8 is a schematic flowchart of a service authorization method based on service authorization manner 2 according to an embodiment. As shown in FIG. 8, the service authorization method includes S801 to S805.

S801: The client sends a first service request message to the first server.

S802: The client receives a first service response message sent by the first server.

The first service request message carries service authorization information.

In a possible method, the service authorization information includes an instance identifier of the second server.

In another possible method, the service authorization information includes the resource identifier of the second server, for example, a URI of the second server. The URI may use a data structure in the following formats:

{apiRoot}/{apiName}/{apiVersion}/{apiSpecificResourceUriPart}.

The URI may include a host name of the second server. The host name of the second server is an apiRoot field in the URI or an authority/host domain in the apiRoot field.

S803: The first server obtains an access token based on the service authorization information.

The access token is used when the first server accesses the second server.

Figure 9:
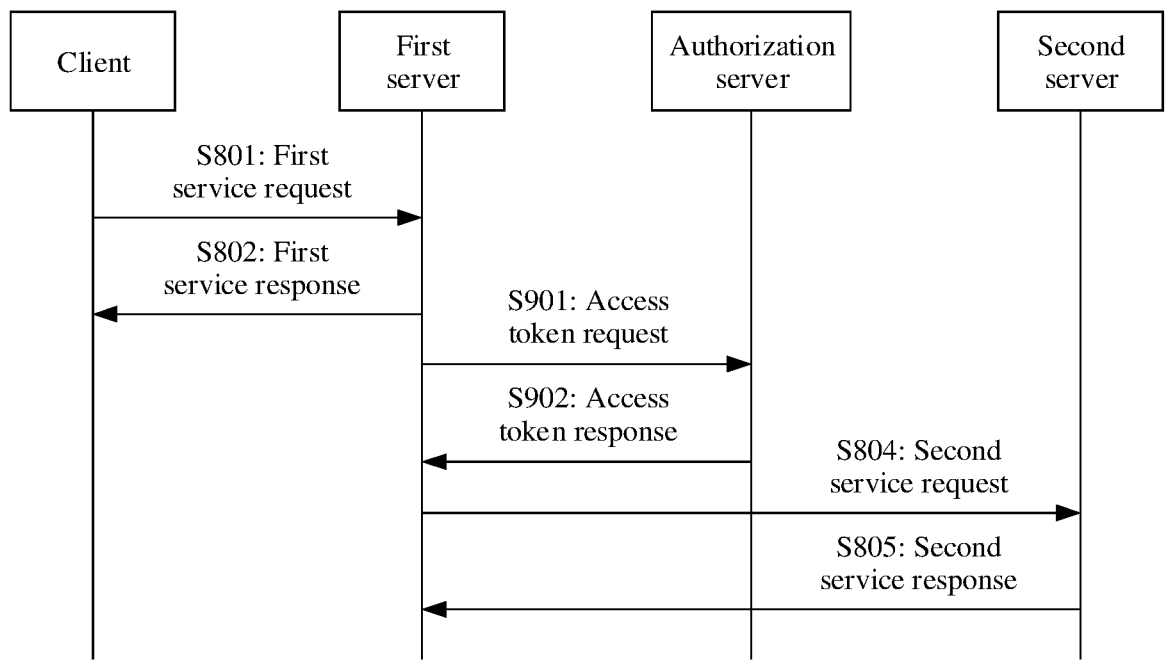
FIG. 9 is a schematic flowchart 2 of a service authorization method based on service authorization manner 2 according to an embodiment.

In a possible method, the service authorization information includes the instance identifier of the second server. As shown in FIG. 9, S803 in which the first server obtains the access token based on the service authorization information may include S901 and S902:

S901: The first server sends an access token request message to the authorization server.

The access token request message carries the instance identifier of the second server, so that the authorization server determines, based on the instance identifier of the second server, that the first server can have permission to access the second server, and generates the access token for the first server.

In addition, the access token request message may further carry an instance identifier of the first server and an expected service name list. The expected service name list may include names of one or more services of the second server.

Then, after receiving the access token request message sent by the first server, the authorization server determines, based on information carried in the access token request message, that the first server can be authorized to access a resource of the second server, generates the access token, and performs the following S902.

That the authorization server determines, based on the information carried in the access token request message, that the first server can be authorized to access the resource of the second server may include the following step:

determining, by the authorization server, to allow the first server to access the second server and the expected service name list.

For example, the generated access token may include an instance identifier of the authorization server, the instance identifier of the first server, the instance identifier of the second server, the service name list, and an access token expiration time.

It should be noted that the access token is a JSON Web token, for example, an access token with a JWS. The JWS may be a digital signature or MAC.

The resource identifier of the second server may be a uniform resource identifier. The instance identifier of the authorization server, the instance identifier of the first server, and the instance identifier of the second server may be instance identifiers, of network functions, in a UUID format.

S902: The first server receives an access token response message sent by the authorization server. The access token response message carries the access token. The access token is generated by the authorization server based on the instance identifier of the second server.

The following describes the service authorization method shown in FIG. 9 by using a packet data unit (PDU) session establishment procedure in a 5G system. An access and mobility management function is a client, a visited session management function is a first server, a home session management function is a second server, and a network repository function is an authorization server.

Figure 10A:
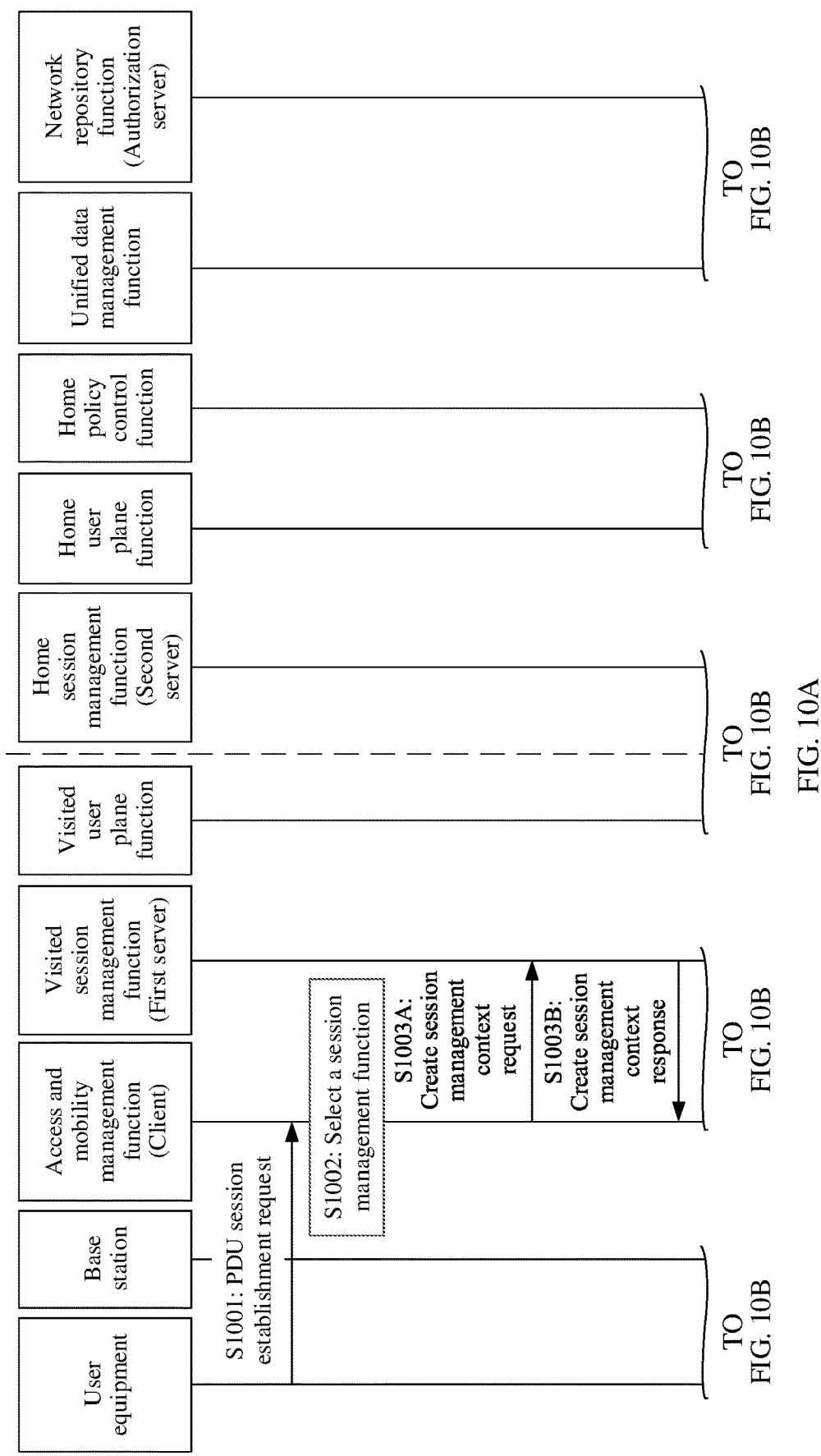
FIG. 10A, FIG. 10B, and FIG. 10C are a schematic flowchart 3 of a service authorization method based on service authorization manner 2 according to an embodiment.
Figure 10B:
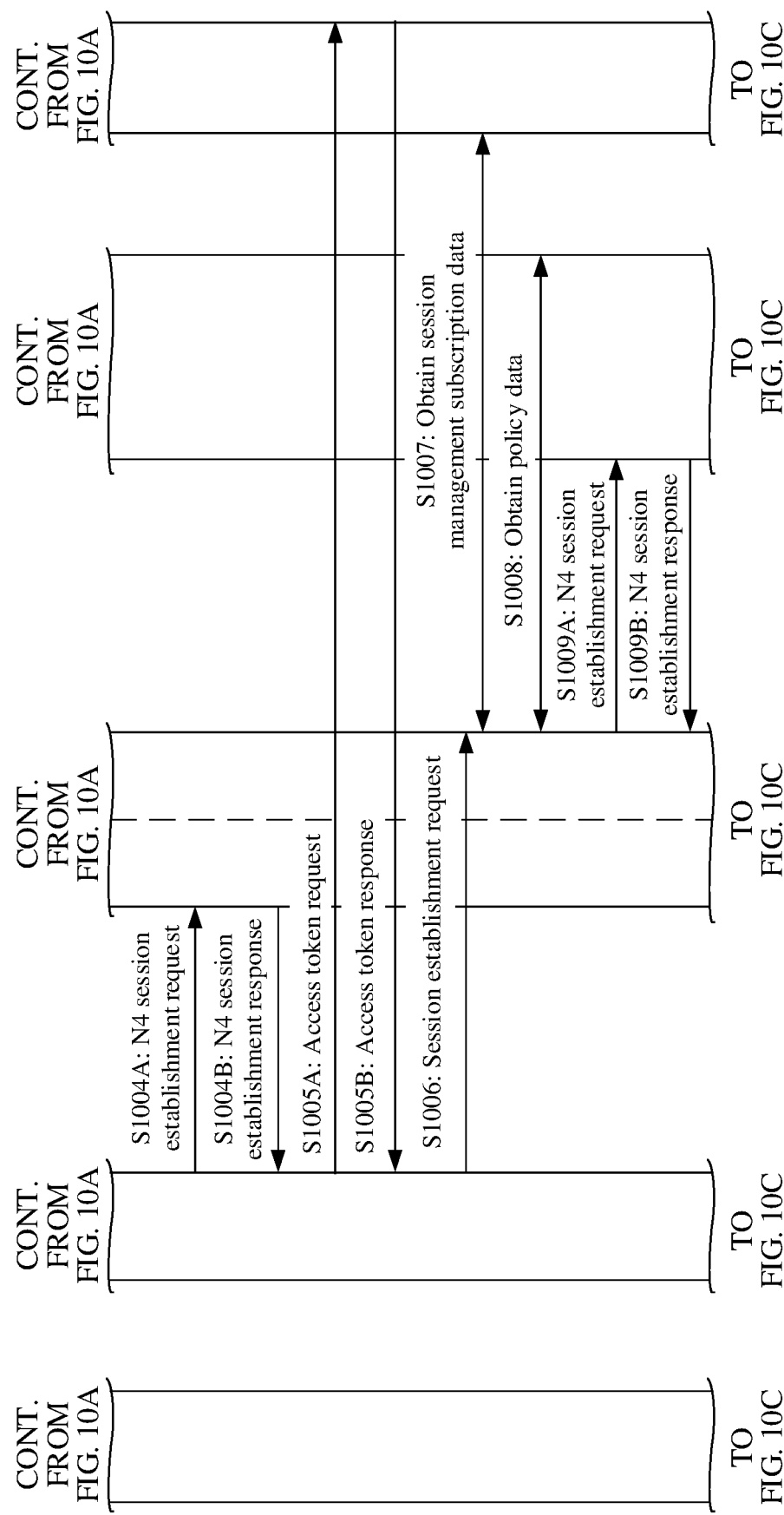
Figure 10C:
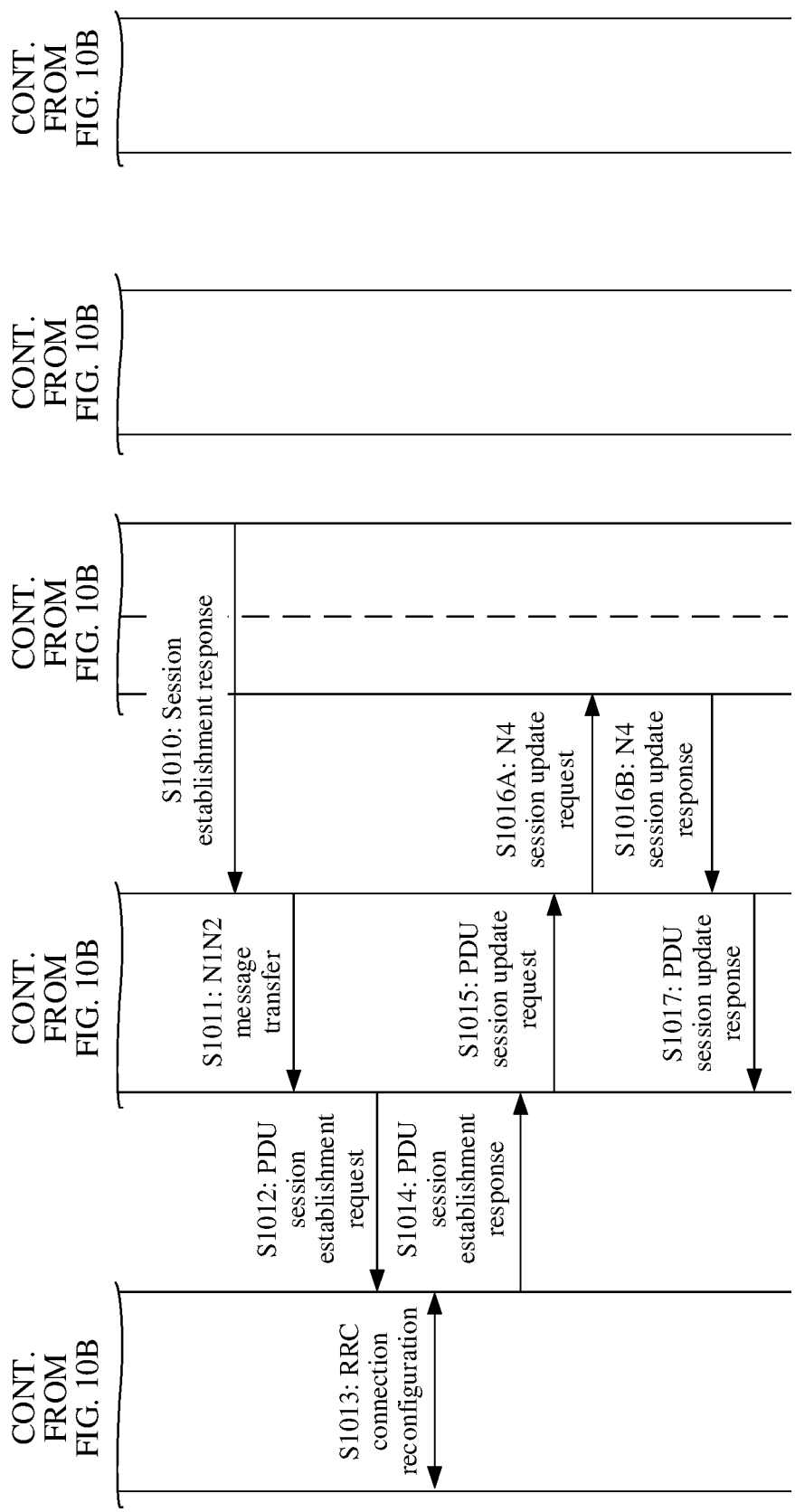

As shown in FIG. 10A, FIG. 10B, and FIG. 10C, the service authorization method shown in FIG. 9 may be implemented as S1001 to S1012.

S1001: User equipment sends a PDU session establishment request to the access and mobility function through a base station.

S1002: The access and mobility management function selects the visited session management function and the home session management function, for example, selects a proper session management function through the network element repository function.

S1003A: The access and mobility management function sends a create session management context request to the visited session management function. The create session management context request carries a resource identifier of the home session management function and an instance identifier of the home session management function.

S1003B: The visited session management function sends a create session management context response to the access and mobility management function.

S1004A: The visited session management function selects the visited user plane function, and sends an N4 session establishment request message to the visited user plane function.

S1004B: The visited user plane function sends an N4 session establishment response message to the visited session management function.

S1005A: The visited session management function sends an access token request message to the network repository function.

The access token request message carries an instance identifier of the visited session management function, the instance identifier of the home session management function, and an expected service name list. The instance identifier of the home session management function is obtained from S1003A, and the expected service name list includes a service name of a service that needs to be invoked in the following S1006.

S1005B: The network repository function determines, based on the information carried in the access token request message, to authorize access to a resource of the home session management function, generates an access token, and sends an access token response message to the visited session management function.

If the network repository function determines to allow the visited session management function to access the home session management function and the expected service name list corresponding to the home session management function, the network repository function generates the access token. The access token includes an instance identifier of the network repository function, the instance identifier of the visited session management function, the instance identifier and the service name list of a home session management function, and an access token expiration time.

It should be noted that the access token is a JSON Web token, for example, an access token with a JWS. The JWS may be a digital signature or MAC.

The resource identifier of the home session management function may be a uniform resource identifier, and the instance identifier of the network repository function, the instance identifier of the visited session management function, and the instance identifier of the home session management function may be instance identifiers, of network functions, in a UUID format.

S1006: If the visited session management function determines that the name of the service, of the home session management function, that needs to be invoked is included in the received service name list of the home session management function in S1005B, the visited session management function sends a session establishment request message to the home session management function represented by the resource identifier of the home session management function. The session establishment request message carries the access token.

S1007: The home session management function obtains session management subscription data corresponding to a current PDU session and the user equipment from a unified data management function.

S1008: The home session management function obtains policy data related to the current PDU session from a home policy control function.

S1009A: The home session management function sends an N4 session establishment request message to a home user plane function.

S1009B: The home user plane function replies to the home session management function with an N4 session establishment response message.

S1010: The home session management function verifies validity of the access token, for example, verifies the signature by using a public key of the network repository function or verifies a MAC value by using a shared key. If verification succeeds, it indicates that the visited session management function is allowed to access the resource, and the home session management function sends a session establishment response message to the visited session management function.

S1011: The visited session management function sends N1N2 message transfer to the access and mobility management function, where the message is used to send PDU session-related information to the base station and the user equipment.

S1012: The access and mobility management function sends a PDU session establishment request message to the base station, and sends data packet forwarding information of the visited user plane function and the like to the base station.

S1013: The base station and the user equipment perform RRC connection reconfiguration, and set up a radio bearer between the user equipment and the base station.

S1014: The base station replies to the access and mobility management function with a PDU session establishment response, where the message carries data packet forwarding information of the base station, and the like.

S1015: The access and mobility management function sends a PDU session update request message to the visited session management function, where the message carries the information obtained from the base station.

S1016: The visited session management function indicates the visited user plane function to establish a service data packet forwarding channel between the visited user plane function and the base station.

Figure 11:
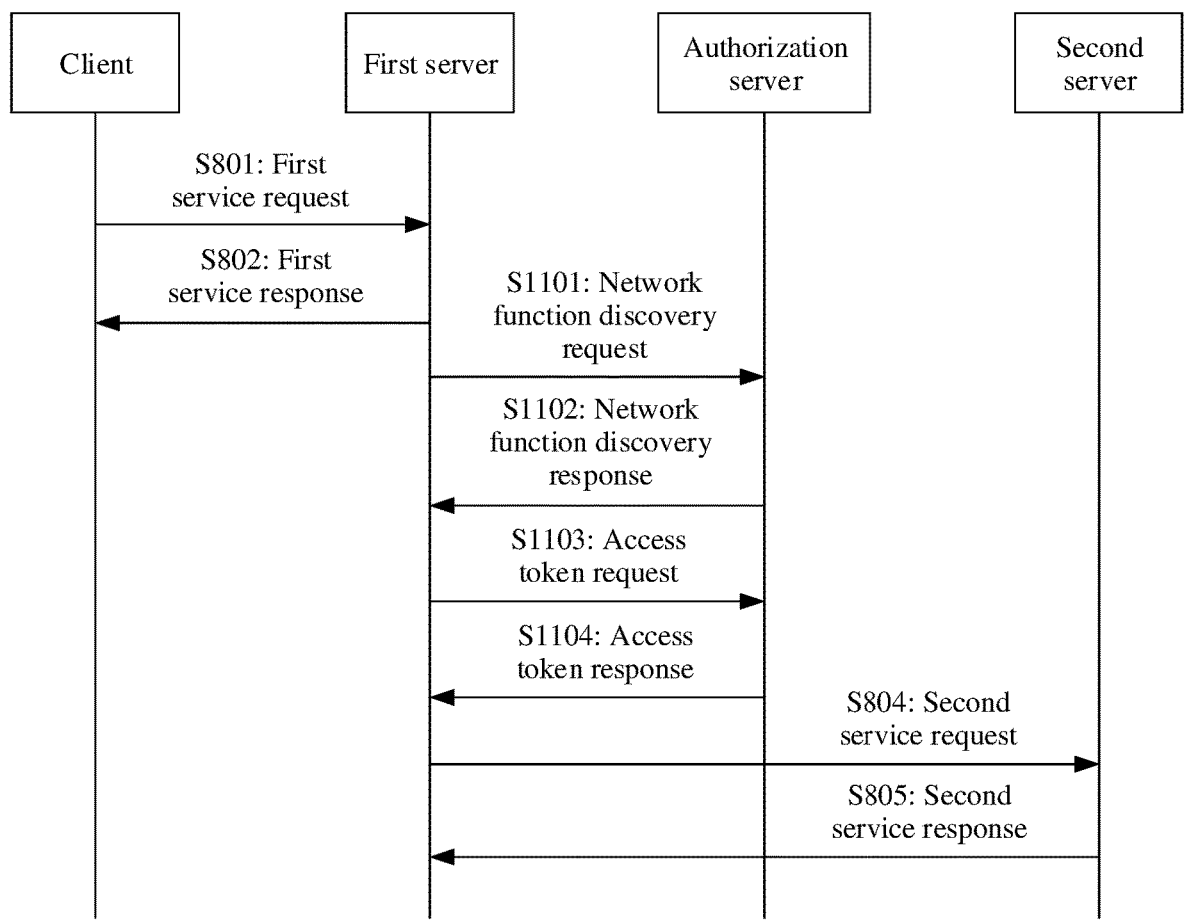
FIG. 11 is a schematic flowchart 4 of a service authorization method based on service authorization manner 2 according to an embodiment.

S1017: The visited session management function replies to the access and mobility management function with a PDU session update response. In another possible method, the foregoing service authorization information includes a resource identifier of the second server. Therefore, as shown in FIG. 11, S803 in which the first server obtains the access token based on the service authorization information may include S1101 to S1104, which are classified into the following two phases: a network function discovery phase and an access token request phase. The following provides separate descriptions.

The network function discovery phase may include S1101 and S1102.

S1101: The first server sends a network function discovery request message to the authorization server.

The network function discovery request message carries a host name of the second server, and the host name of the second server is a part of the resource identifier of the second server.

The resource identifier of the second server is in the following format:
{apiRoot}/{apiName}/{apiVersion}/{apiSpecificResourceUriPart}.

The host name of the second server may be an apiRoot field, or an authority/host domain in the apiRoot field.

After receiving the network function discovery request message, the authorization server may determine the instance identifier of the second server based on the host name of the second server, and then send a network function discovery response message to the first server. The network function discovery response message carries the instance identifier of the second server.

For example, when registering with the authorization server, the second server carries information such as the host name of the second server and the instance identifier of the second server. The authorization server receives and stores the host name of the second server and the instance identifier of the second server. After receiving the network function discovery request message, the authorization server may determine the instance identifier of the second server based on the host name of the second server carried in the network function discovery request message.

S1102: The first server receives the network function discovery response message sent by the authorization server.

The network function discovery response message carries the instance identifier of the second server.

The access token request phase may include S1103 and S1104.

S1103: The first server sends an access token request message to the authorization server.

The access token request message carries the instance identifier of the second server.

In addition, the access token request message may further carry the instance identifier of the second server and an expected service name list.

After receiving the access token request message, the authorization server determines to allow the first server to access a resource of the second server and the corresponding expected service name list, generates an access token, and sends an access token response message to the first server. The access token response message carries the access token.

S1104: The first server receives the access token response message sent by the authorization server.

The access token response message carries the access token, and the access token is generated by the authorization server based on the instance identifier of the second server.

The access token may further include an instance identifier of the authorization server, an instance identifier of the first server, the instance identifier of the second server, the service name list, and an access token expiration time.

The following describes the service authorization method shown in FIG. 11 by using a PDU session establishment procedure in a 5G system. An access and mobility management function is a client, a visited session management function is a first server, a home session management function is a second server, and a network repository function is an authorization server.

Figure 12B:
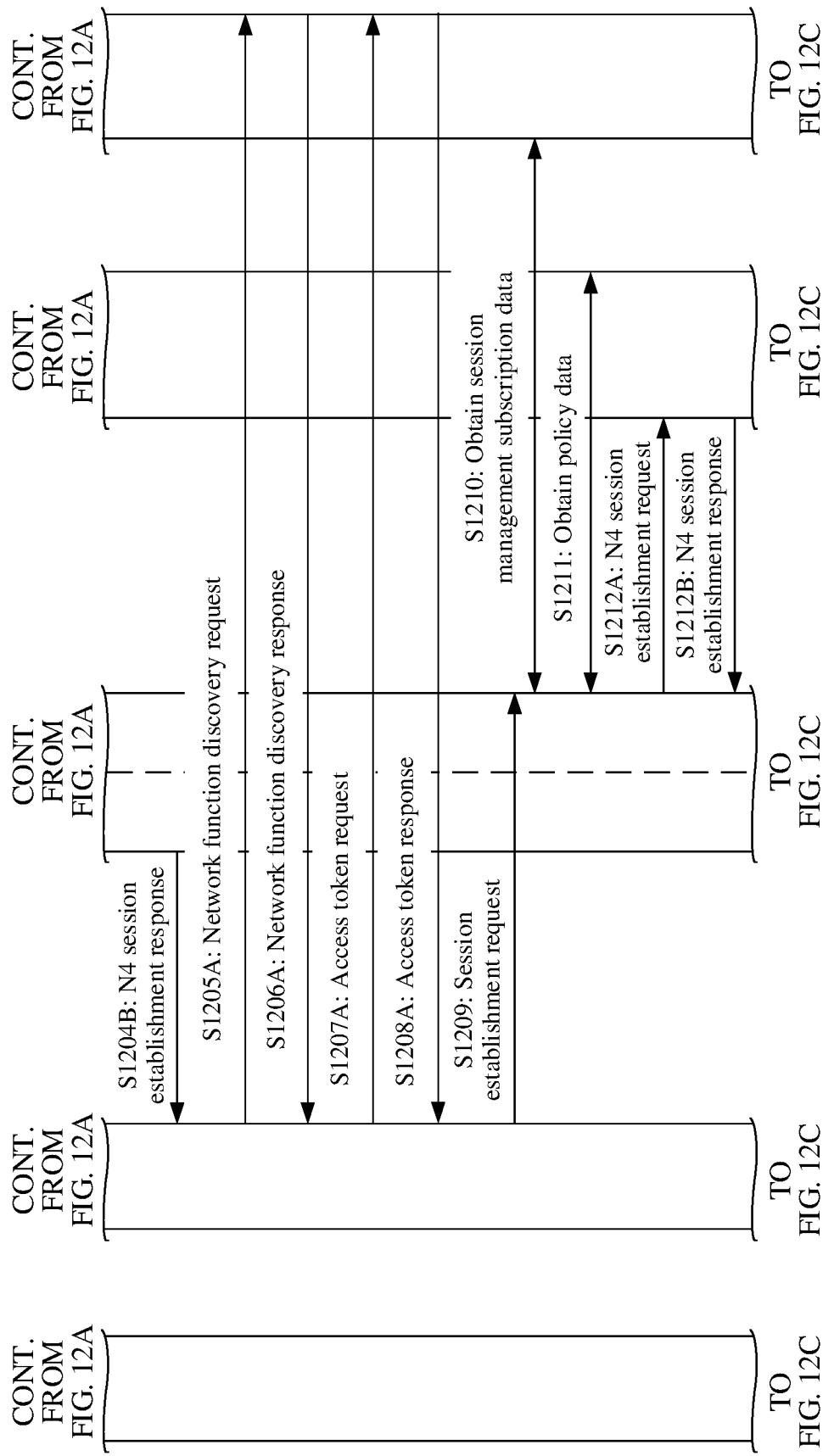
Figure 12C:
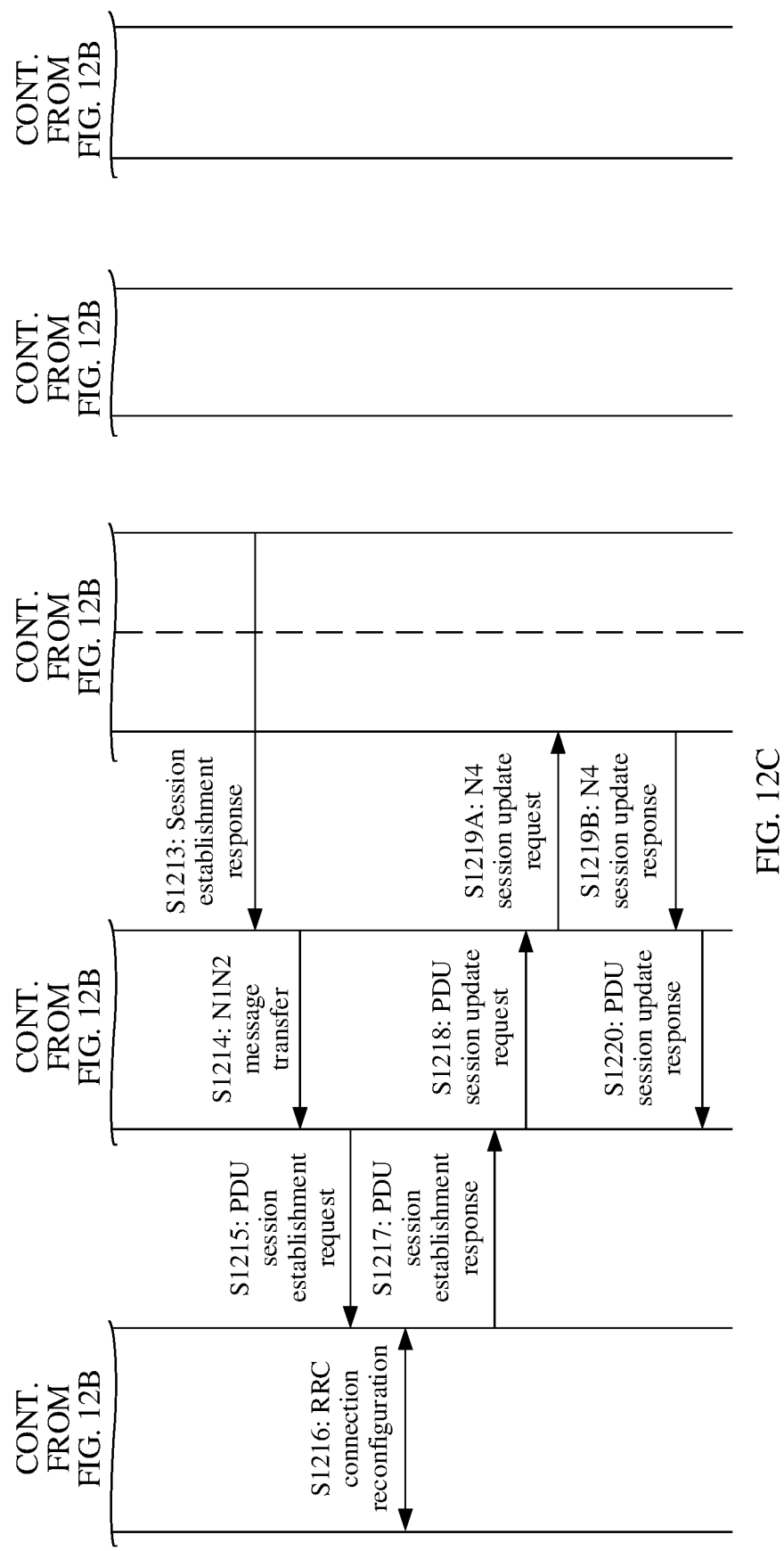

The service authorization method shown in FIG. 12A, FIG. 12B, and FIG. 12C may be implemented as S1201 to S1220.

S1201: User equipment sends a PDU session establishment request message to the access and mobility management function through a base station.

S1202: The access and mobility management function selects the visited session management function and the home session management function.

For example, the access and mobility management function may select a proper session management function through the network repository function.

S1203A: The access and mobility management function sends a create session management context request message to the visited session management function.

The create session management context request message carries a resource identifier of the home session management function.

S1203B: The visited session management function replies to the access and mobility management function with a create session management context response message.

The create session management context request message carries an instance identifier of the home session management function.

S1204: The visited session management function selects a user plane function, and sends an N4 session establishment request message to the user plane function.

The visited session management function needs to access a resource of home session management corresponding to the resource identifier, of the home session management function, carried in the create session management context request message.

Then, the visited session management function may obtain, through the network repository function, an access token for accessing the home session management function. Herein, the foregoing access token generation manner 1 is used to generate the access token:

Access Token Generation Manner 1:

S1205A: The visited session management function obtains a host name of the home session management function based on the resource identifier, of the home session management function, carried in the create session management context request message, and sends a network function discovery request message to the network repository function. The host name of the home session management function is a part of the resource identifier of the home session management function. The host name of the home session management function may be apiRoot or authority/host in apiRoot. The resource identifier of the home session management function is in the following format:

{apiRoot}/{apiName}/{apiVersion}/{apiSpecificResourceUriPart}.

The network function discovery request message carries the host name of the home session management function.

S1206A: The network repository function determines the instance identifier of the home session management function based on the host name of the home session management function, and replies to the visited session management function with a network function discovery response message. The network function discovery response message carries the instance identifier of the home session management function.

For example, when the home session management function registers with the network repository function, home session management function information is carried. The home session management function information includes information such as the host name of the home session management function and the instance identifier of the home session management function. The network repository function receives and stores the foregoing information of the home session management function, and determines the instance identifier, of the home session management function, in the home session management function information based on the host name, of the home session management function, carried in the network function discovery request message.

S1207A: The visited session management function sends an access token request message to the network repository function.

The access token request message carries an instance identifier of the visited session management function, the instance identifier of the home session management function, and an expected service name list.

S1208A: The network repository function determines, based on the information carried in the access token request message, to authorize access to the resource of the home session management function, generates an access token, and sends an access token response message to the visited session management function.

For example, that the network repository function determines, based on the information carried in the access token request message, to authorize access to the resource of the home session management function, and generates the access token includes: if the network repository function determines to allow the visited session management function to access the home session management function and the expected service name list, the network repository function generates the access token.

The access token includes an instance identifier of the network repository function, the instance identifier of the visited session management function, the instance identifier and the service name list of the home session management function, and an access token expiration time.

S1209: If the visited session management function determines that a name of a service, of the home session management function, that needs to be invoked is included in the service name list, of the home session management function, in the access token, the visited session management function sends a session establishment request message to the home session management function corresponding to the resource identifier of the home session management function. The session establishment request message carries the access token.

S1210: The home session management function obtains session management subscription data corresponding to a current PDU session/the user equipment from a unified data management function.

S1211: The home session management function obtains policy data related to the current PDU session from a home policy control function.

S1212A: The home session management function selects a home user plane function, and sends an N4 session establishment request message to the home user plane function.

S1212B: The home user plane function sends an N4 session establishment response message to the home session management function.

S1213: The home session management function verifies validity of the access token, for example, verifies a signature by using a public key of the network repository function or verifies a MAC value by using a shared key. If verification succeeds, it indicates that the visited session management function is allowed to access a service, and the home session management function sends a session establishment response message to the visited session management function.

S1214: The visited session management function sends N1N2 message transfer to the access and mobility management function, where the message is used to send PDU session-related information to the base station and the user equipment.

S1215: The access and mobility management function sends a PDU session establishment request message to the base station, and sends data packet forwarding information of the visited user plane function and the like to the base station.

S1216: The base station and the user equipment perform RRC connection reconfiguration, and set up a radio bearer between the user equipment and the base station.

S1217: The base station replies to the access and mobility management function with a PDU session establishment response, where the message carries data packet forwarding information of the base station, and the like.

S1218: The access and mobility management function sends a PDU session update request message to the visited session management function, where the message carries the information obtained from the base station.

S1219: The visited session management function indicates the visited user plane function to establish a service data packet forwarding channel between the visited user plane function and the base station.

S1220: The visited session management function replies to the access and mobility management function with a PDU session update response.

Figure 13:
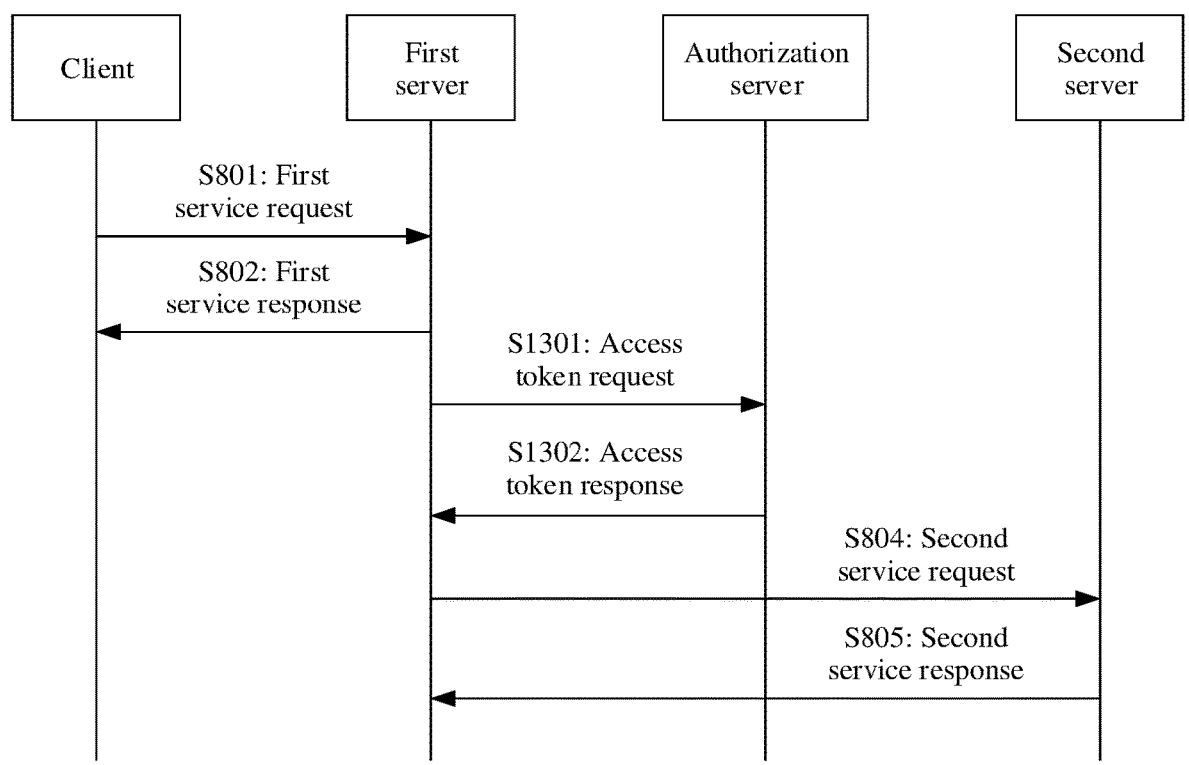
FIG. 13 is a schematic flowchart 6 of a service authorization method based on service authorization manner 2 according to an embodiment.

In still another possible method, the foregoing service authorization information includes a resource identifier of the second server. The resource identifier of the second server includes a host name of the second server. Different from the service authorization method shown in FIG. 11, to reduce interaction times between the first service and the authorization server and improve a speed of applying for the access token, the host name of the second server may alternatively be directly sent to the authorization server. Then, the authorization server directly generates the access token after obtaining the instance identifier of the second server. In other words, the access token may alternatively be generated through the foregoing token generation manner 2. Therefore, as shown in FIG. 13, S803 in which the first server obtains the access token based on the service authorization information may alternatively include S1301 and S1302.

S1301: The first server sends an access token request message to the authorization server.

The access token request message carries the host name of the second server, and the host name of the second server is a part of the resource identifier of the second server.

In addition, the access token request message may further carry an instance identifier of the first server and an expected service name list.

After receiving the access token request message, the authorization server may obtain the instance identifier of the second server based on the host name of the second server carried in the access token request message, and generate the access token based on the instance identifier of the second server.

Then, the authorization server may send an access token response message to the first server. The access token response message carries the access token.

S1302: The first server receives the access token response message sent by the authorization server.

The access token response message carries the access token, and the access token is generated by the authorization server based on the host name of the second server.

The access token includes an instance identifier of the authorization server, the instance identifier of the first server, the instance identifier of the second server, the service name list, and the access token expiration time.

The following describes the service authorization method shown in FIG. 13 by using a PDU session establishment procedure in a 5G system. An access and mobility management function is a client, a visited session management function is a first server, a home session management function is a second server, and a network repository function is an authorization server.

As shown in FIG. 14A, FIG. 14B, and FIG. 14C, the service authorization method shown in FIG. 13 may be implemented as S1401 to S1404B and S1407B to S1420.

For S1401 to S1404B, refer to the related descriptions of S1201 to S1204B. For S1409 to S1420, refer to the related descriptions of S1209 to S1220. Details are not described herein again.

Compared with the service authorization method shown in FIG. 12A, FIG. 12B, and FIG. 12C, the service authorization method shown in FIG. 14A, FIG. 14B, and FIG. 14C does not include a network function discovery phase, and includes only an access token request phase, that is, S1407B and S1408B.

S1407B: The visited session management function sends an access token request message to the network repository function.

The access token request message carries an instance identifier and a network function type of the visited session management function, a host name of the home session management function, and an expected service name list.

S1408B: The network repository function determines, based on the information carried in the access token request message in S1407B, to authorize access to a resource of the home session management function, generates an access token, and sends an access token response message to the visited session management function.

For example, the network repository function determines an instance identifier of the home session management function based on the host name of the home session management function (for a determining method, refer to access token generation manner 1), and determines to authorize access to the resource of the home session management function corresponding to the instance identifier of the home session management function.

It should be noted that the access token is a JSON Web token, for example, an access token with a JWS. The JWS may be a digital signature or MAC.

A resource identifier of the home session management function is a uniform resource identifier, and the instance identifier of the visited session management function and the instance identifier of the home session management function may be instance identifiers, of network functions, in a UUID format.

S804: The first server sends a second service request message to the second server.

S805: The first server receives a second service response message sent by the second server.

The second service request message carries the access token.

It should be noted that, for service authorization manner 2, the first server needs to apply for, only for the first server, the access token for the second server. Therefore, the access token applied for by the first server for the first server may not include an instance identifier of the client.

In addition, for the foregoing service authorization manner 2, to further improve accuracy of applying for the access token, in addition to the instance identifier or the resource identifier of the foregoing second server, the foregoing service authorization information may further include a name of a service that needs to be accessed by the first server. Therefore, optionally, when the service authorization information includes the instance identifier of the second server, or the service authorization information includes the resource identifier of the second server, the service authorization information may further include the service name of the second server. The service name of the second server is the name of the service that needs to be accessed by the first server. The service name of the second server is used by the first server to determine an expected service name list, so that the first server adds the expected service name list to the access token request when sending the access token request to the authorization server.

According to the service authorization method provided in this embodiment, the first server applies for, based on the service authorization information carried in the first service request message sent by the client, service authorization to access the second server by the first server, and accesses the second server based on the service authorization obtained through application. This can resolve a problem that in a scenario in which the second server is discovered by the client, the first server fails to obtain service authorization to access the second server, so as to reduce a security risk of a service-based network.

The foregoing describes in detail the service authorization method provided in the embodiments with reference to FIG. 5 to FIG. 14C. The following describes in detail communications apparatus provided in the embodiments with reference to FIG. 15 to FIG. 19.

Figure 15:
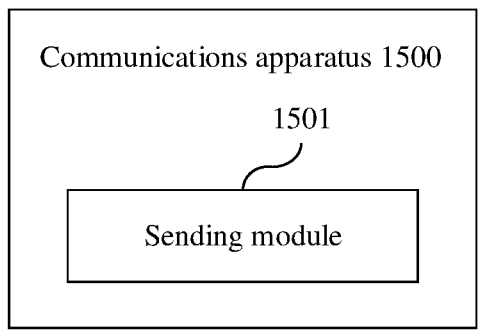
FIG. 15 is a schematic structural diagram 1 of a communications apparatus according to an embodiment.

FIG. 15 is a schematic structural diagram of a communications apparatus according to an embodiment. The communications apparatus is applicable to the system shown in FIG. 1, and perform a function of a client in the foregoing method embodiments. For ease of description, FIG. 15 shows only main components of the communications apparatus. As shown in FIG. 15, the communications apparatus 1500 includes a sending module 1501.

The sending module 1501 is configured to send a first service request message to a first server. The first service request message carries service authorization information, and the service authorization information is used when the first server accesses a second server.

Figure 16:
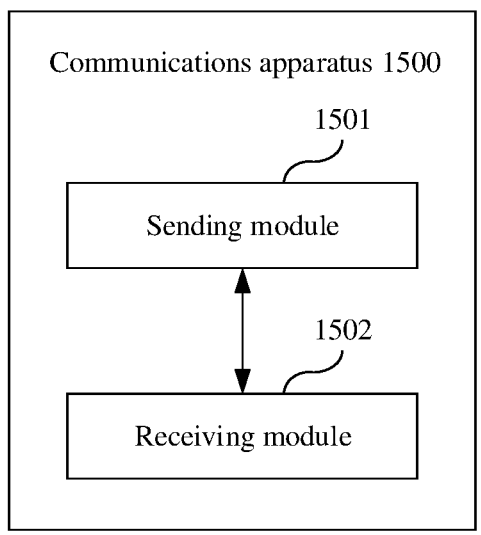
FIG. 16 is a schematic structural diagram 2 of a communications device according to an embodiment.

In a possible embodiment, the service authorization information includes an access token. With reference to FIG. 15, as shown in FIG. 16, the communications apparatus 1500 further includes a receiving module 1502.

The sending module 1501 is further configured to send an access token request message to an authorization server before the sending module 1501 sends the first service request message to the first server. The access token request message carries an instance identifier of the communications apparatus and an instance identifier of the first server.

The receiving module 1502 is configured to receive an access token response message sent by the authorization server. The access token response message carries the access token.

The sending module 1501 is further configured to send the first service request message to the first server. The first service request message includes the access token. The access token includes the instance identifier of the first server. Alternatively, the access token includes the instance identifier of the communications apparatus and the instance identifier of the first server.

Optionally, the access token request message further carries a network function type of the communications apparatus and/or a network function type of the first server.

Figure 17:
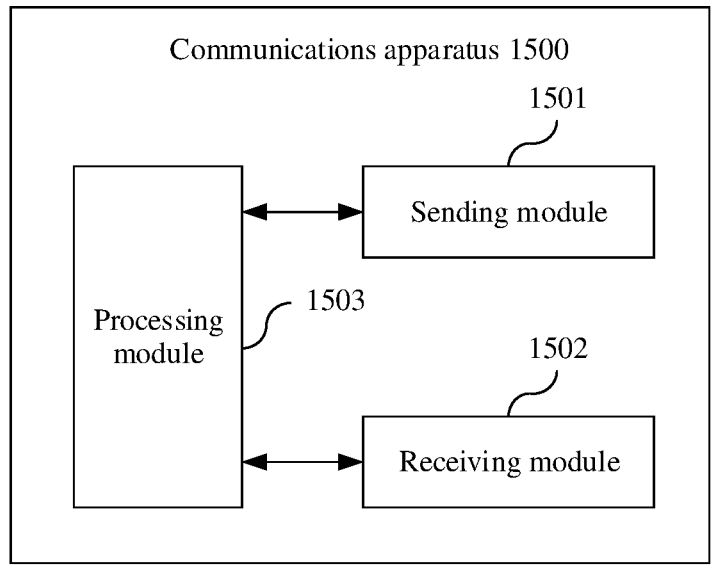
FIG. 17 is a schematic structural diagram 3 of a communications apparatus according to an embodiment.

Optionally, the access token may further include an access token expiration time. With reference to FIG. 16, as shown in FIG. 17, the communications apparatus 1500 may further include a processing module 1503.

The processing module 1503 is configured to: if the processing module 1503 determines, based on the access token expiration time, that the access token has expired, control the sending module 1501 and the receiving module 1502 to apply to the authorization server for a new access token, and control the sending module 1501 to notify the new access token to the first server.

Optionally, when the service authorization information includes an instance identifier of the second server, or the service authorization information includes a resource identifier of the second server, the service authorization information may further include a service name of the second server. The service name of the second server is a name of a service that needs to be accessed by the first server.

In addition, the communications apparatus 1500 may further include a storage module, configured to store an instruction and data of the communications apparatus 1500.

It should be noted that the communications apparatus 1500 may be the foregoing client, or may be a chip system disposed in the foregoing client. This is not limited in the embodiments.

Figure 18:
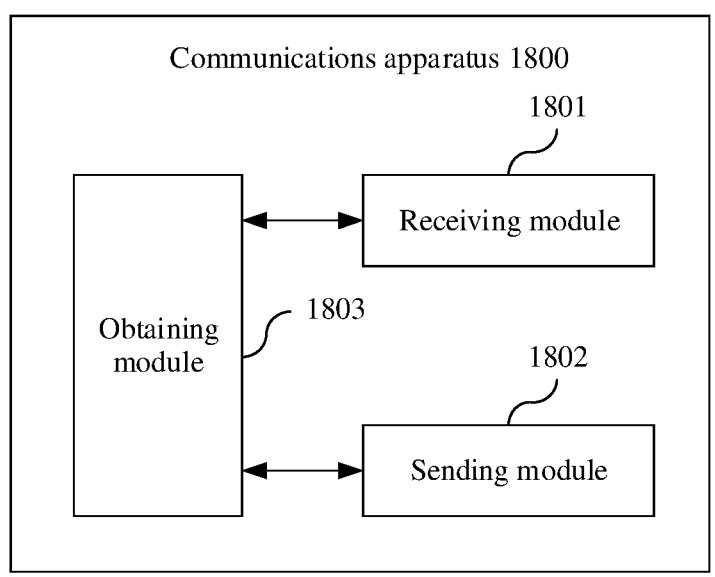
FIG. 18 is a schematic structural diagram of another communications device according to an embodiment.

FIG. 18 is a schematic structural diagram of another communications apparatus according to an embodiment. The communications apparatus is applicable to the communications system shown in FIG. 1, and perform a function of a first server in the foregoing method embodiments. For ease of description, FIG. 18 shows only main components of the communications apparatus. As shown in FIG. 18, the communications apparatus 1800 includes a receiving module 1801, a sending module 1802, and an obtaining module 1803.

The receiving module 1801 is configured to receive a first service request message sent by a client. The first service request message carries service authorization information.

The obtaining module 1803 is configured to obtain an access token based on the service authorization information. The access token is used when the communications apparatus 1800 accesses a second server.

The sending module 1802 is configured to send a second service request message to the second server. The second service request message carries the access token.

In a possible embodiment, the service authorization information includes an instance identifier of the second server.

Correspondingly, the sending module 1802 is further configured to send an access token request message to an authorization server. The access token request message carries the instance identifier of the second server.

The receiving module 1801 is further configured to receive an access token response message sent by the authorization server. The access token response message carries the access token, and the access token is generated by the authorization server based on the instance identifier of the second server.

In another possible embodiment, the service authorization information includes a resource identifier of the second server.

Correspondingly, the sending module 1802 is further configured to send a network function discovery request message to an authorization server. The network function discovery request message carries a host name of the second server, and the host name of the second server is a part of the resource identifier of the second server.

The receiving module 1801 is further configured to receive a network function discovery response message sent by the authorization server. The network function discovery response message carries an instance identifier of the second server.

The sending module 1802 is further configured to send an access token request message to the authorization server. The access token request message carries the instance identifier of the second server.

The receiving module 1801 is further configured to receive an access token response message sent by the authorization server. The access token response message carries the access token, and the access token is generated by the authorization server based on the instance identifier of the second server.

In still another possible embodiment, the service authorization information includes a resource identifier of the second server.

Correspondingly, the sending module 1802 is further configured to send an access token request message to an authorization server. The access token request message carries a host name of the second server, and the host name of the second server is a part of the resource identifier of the second server.

The receiving module 1801 is further configured to receive an access token response message sent by the authorization server. The access token response message carries the access token, and the access token is generated by the authorization server based on the host name of the second server.

Optionally, the access token applied for by the first server includes an instance identifier of the second server.

In addition, the communications apparatus 1800 may further include a storage module, configured to store an instruction and data of the communications apparatus 1800.

It should be noted that the communications apparatus 1800 may be the foregoing first server, or may be a chip system disposed in the foregoing first server. This is not limited in the embodiments.

Figure 19:
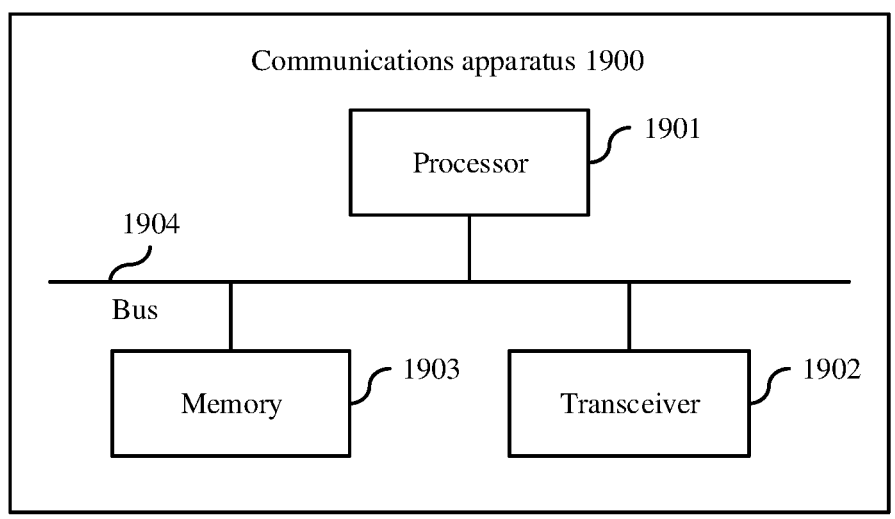
FIG. 19 is a schematic structural diagram of still another communications apparatus according to an embodiment.

FIG. 19 is a schematic structural diagram of still another communications apparatus according to an embodiment. The communications apparatus is applicable to the communications system shown in FIG. 1, and perform a function of a client in the foregoing method embodiments, or perform a function of a first server in the foregoing method embodiments. For ease of description, FIG. 19 shows only main components of the communications apparatus.

As shown in FIG. 19, the communications apparatus 1900 includes a processor 1901 and a transceiver 1902. The processor 1901 is coupled to a memory 1903. For example, the processor 1901 is connected to the memory 1903 through a bus 1904. The processor 1901 is configured to execute a computer program stored in the memory 1903, so that the communications apparatus 1900 performs the function of the client in the foregoing method embodiments, or performs the function of the first server in the foregoing method embodiments.

It should be noted that the communications apparatus 1900 may be the foregoing client or the foregoing first server, or may be a chip system disposed in the foregoing client or the foregoing first server. This is not limited in the embodiments.

An embodiment provides a communications system. The communications system includes the foregoing client, the foregoing first server, the foregoing authorization server, and the foregoing second server.

An embodiment provides a computer-readable storage medium, where the computer-readable storage medium stores programs or instructions. When the programs or the instructions are run on a computer, the computer is enabled to perform the service authorization method in the foregoing method embodiments.

An embodiment provides a computer program product, including computer program code. When the computer program code is run on a computer, the computer is enabled to perform the service authorization method described in the foregoing method embodiments.

It should be understood that, the processor in the embodiments may be a central processing unit (CPU), or may be another general purpose processor, a digital signal processor (DSP), an application-specific integrated circuit (ASIC), a field-programmable gate array (FPGA), or another programmable logic device, a discrete gate or a transistor logic device, a discrete hardware component, or the like. The general purpose processor may be a microprocessor, or the processor may be any conventional processor or the like.

It should be further understood that the memory in the embodiments may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAM may be used, for example, a static random access memory (SRAM), a dynamic random access memory (DRAM), a synchronous dynamic random access memory (SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware (for example, a circuit), firmware, or any combination thereof. When software is used to implement the embodiments, all or some of the foregoing embodiments may be implemented in a form of a computer program product. The computer program product includes one or more computer instructions or computer programs. When the computer instructions or the computer programs are loaded or executed on a computer, all or some of the procedures or functions according to the embodiments are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" describes only an association relationship between associated objects and represents that three relationships may exist. For example, A and/or B may represent the following three cases: only A exists, both A and B exist, and only B exists. A and B may be singular or plural. In addition, the character "/" usually represents an "or" relationship between the associated objects, or may represent an "and/or" relationship. A specific meaning depends on a context.

In the embodiments, "at least one" means one or more, and "a plurality of" means two or more. "At least one item (piece) of the following" or a similar expression thereof means any combination of these items, including a singular item (piece) or any combination of plural items (pieces). For example, at least one of a, b, and c may indicate: a, b, c, a-b, a-c, b-c, or a-b-c, where a, b, and c may be singular or plural.

It should be understood that, in the embodiments, sequence numbers of the foregoing processes do not mean an execution sequence. The execution sequence of the processes should be determined based on functions and internal logic of the processes, and should not constitute any limitation to implementation processes of the embodiments.

A person of ordinary skill in the art may be aware that units and algorithm steps in the examples described with reference to the embodiments may be implemented by electronic hardware or a combination of computer software and electronic hardware. Whether the functions are performed by hardware or software depends on particular applications and design constraint conditions of the solutions. A person of ordinary skill in the art may use different methods to implement the described functions for each particular application, but it should not be considered that the implementation goes beyond the scope of the embodiments.

It may be clearly understood by a person of ordinary skill in the art that, for the purpose of convenient and brief description, for a detailed working process of the foregoing system, apparatus, and unit, refer to a corresponding process in the foregoing method embodiments. Details are not described herein again.

In the several embodiments provided, it should be understood that the system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, functional units in the embodiments may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the solutions essentially, or the part contributing to the current technology, or some of the solutions may be implemented in a form of a software product. The software product is stored in a storage medium, and includes several instructions for instructing a computer device (which may be a personal computer, a server, or a network device) to perform all or some of the steps of the methods described in the embodiments. The storage medium includes any medium that can store program code, for example, a USB flash drive, a removable hard disk, a ROM, a RAM, a magnetic disk, or an optical disc.

The foregoing descriptions are merely implementations of the embodiments, and should not be interpreted as limiting.

The invention claimed is:

1. A service authorization method comprising:
receiving, by a first session management function, a first service request message from a client, wherein the first service request message carries service authorization information comprising an instance identifier of a second session management function, and wherein the instance identifier of the second session management function identifies a session management function instance;
sending, by the first session management function, an access token request message carrying the instance identifier of the second session management function to an authorization server, wherein the access token request message requests an access token for the first session management function to access the second session management function;
receiving, by the first session management function, an access token response message carrying the access token from the authorization server, wherein the access token is based on the instance identifier of the second session management function; and
sending, by the first session management function, a second service request message to the second session management function, wherein the second service request message carries the access token.

2. The service authorization method according to claim 1, wherein the access token comprises the instance identifier of the second session management function.

3. The service authorization method according to claim 1, wherein the access token comprises an access token expiration time and the access token becomes invalid after the access token expiration time is expired.

4. The service authorization method according to claim 1, further comprising:
  sending, by the client, the first service request message to the first session management function.

5. The service authorization method according to claim 4, wherein, before sending, by the client, the first service request message to the first session management function, the method further comprises:
  discovering, by the client, the second session management function.

6. The service authorization method according to claim 1, further comprising:
  receiving, by the authorization server, the access token request message from the first session management function; and
  sending, by the authorization server, the access token response message to the first session management function.

7. The service authorization method according to claim 1, further comprising:
  receiving, by the second session management function, the second service request message from the first session management function.

8. The service authorization method according to claim 1, wherein the client is an access and mobility management function, the first session management function is a visited session management function, the second session management function is a home session management function, and the authorization server is a network repository function.

9. A communications apparatus, comprising a processor coupled with a memory storing computer-readable instructions which, when executed by the processor, cause the communications apparatus to:
  receive a first service request message from a client, wherein the first service request message carries service authorization information comprising an instance identifier of a second session management function, and wherein the instance identifier of the second session management function identifies a session management function instance;
  send an access token request message carrying the instance identifier of the second session management function to an authorization server, wherein the access token request message requests an access token for the communications apparatus to access the second session management function;
  receive an access token response message carrying the access token from the authorization server, wherein the access token is based on the instance identifier of the second session management function; and
  send a second service request message to the second session management function, wherein the second service request message carries the access token.

10. The communications apparatus according to claim 6, wherein the access token comprises the instance identifier of the second session management function.

11. The communications apparatus according to claim 9, wherein the access token comprises an access token expiration time and the access token becomes invalid after the access token expiration time is expired.

12. The communications apparatus according to claim 9, wherein the communications apparatus is a visited session management function, the client is an access and mobility management function, the second session management function is a home session management function, and the authorization server is a network repository function.

13. A non-transitory computer-readable storage medium, comprising instructions which, when executed by at least one processor of a communication apparatus, cause the communication apparatus to:
  receive a first service request message from a client, wherein the first service request message carries service authorization information comprising an instance identifier of a second session management function, and wherein the instance identifier of the second session management function identifies a session management function instance;
  send an access token request message carrying the instance identifier of the second session management function to an authorization server, wherein the access token request message requests an access token for the communication apparatus to access the second session management function;
  receive an access token response message carrying the access token from the authorization server, wherein the access token is based on the instance identifier of the second session management function; and
  send a second service request message to the second session management function, wherein the second service request message carries the access token.

14. A communication system comprising a first session management function, and a client, wherein the first session management function comprises a processor coupled with a memory storing computer-readable instructions, and is configured to:
  receive a first service request message from the client, wherein the first service request message carries service authorization information comprising an instance identifier of a second session management function, and wherein the instance identifier of the second session management function identifies a session management function instance;
  send an access token request message carrying the instance identifier of the second session management function to an authorization server, wherein the access token request message requests an access token for the first session management function to access the second session management function;
  receive an access token response message carrying the access token from the authorization server, wherein the access token is based on the instance identifier of the second session management function; and
  send a second service request message to the second session management function, wherein the second service request message carries the access token; and
  the client comprises a processor coupled with a memory storing computer-readable instructions, and is configured to:
  send the first service request message to the first session management function.

15. The communication system according to claim 14, wherein the communication system further comprises the authorization server configured to:
  receive the access token request message from the first session management function; and
  send the access token response message to the first session management function.

16. The communication system according to claim 14, wherein the communication system further comprises the second session management function configured to:
receive the second service request message from the first session management function.

17. The communication system according to claim 14, wherein the client is an access and mobility management function, the first session management function is a visited session management function, the second session management function is a home session management function, and the authorization server is a network repository function.

18. The communication system according to claim 14, wherein the client is further configured to:
discover the second session management function before sending the first service request message to the first session management function.

* * * * *